(12) United States Patent
Hirano et al.

(10) Patent No.: US 8,966,099 B2
(45) Date of Patent: Feb. 24, 2015

(54) SESSION CHANGE METHOD AND SESSION CHANGE DEVICE

(75) Inventors: Jun Hirano, Kanagawa (JP); Takahisa Aoyama, Kanagawa (JP); Shinkichi Ikeda, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 96 days.

(21) Appl. No.: 13/257,878

(22) PCT Filed: Mar. 24, 2010

(86) PCT No.: PCT/JP2010/002087
§ 371 (c)(1),
(2), (4) Date: Sep. 20, 2011

(87) PCT Pub. No.: WO2010/109860
PCT Pub. Date: Sep. 30, 2010

(65) Prior Publication Data
US 2012/0011261 A1 Jan. 12, 2012

(30) Foreign Application Priority Data

Mar. 25, 2009 (JP) .................................. 2009-073281
Mar. 12, 2010 (JP) .................................. 2010-055989

(51) Int. Cl.
*G06F 15/16* (2006.01)
*H04L 29/06* (2006.01)
*H04L 29/08* (2006.01)

(52) U.S. Cl.
CPC ............ *H04L 65/1066* (2013.01); *H04L 67/16* (2013.01); *H04L 67/148* (2013.01); *H04L 65/4076* (2013.01)
USPC ........................................................ 709/228

(58) Field of Classification Search
CPC .............. H04L 29/06; H04L 29/08072; H04L 29/08576; H04L 29/0809; H04L 29/06537

USPC .................................................. 709/227–229
See application file for complete search history.

(56) References Cited

U.S. PATENT DOCUMENTS 6,460,083 B1 * 10/2002 Niwa et al. .................... 709/227
(Continued)

FOREIGN PATENT DOCUMENTS

| JP | 2004-356922 | 12/2004 |
| JP | 2006-237815 | 9/2006 |
| JP | 2007-104163 | 4/2007 |

OTHER PUBLICATIONS

International Search Report dated Jun. 15, 2010.
Bulterman, et al., "Synchronized Multimedia Integration Language (SMIL 3.0)," W3C Recommendation, Dec. 1, 2008, 21 pages total.
(Continued)

*Primary Examiner* — Vivek Srivastava
*Assistant Examiner* — Sibte Bukhari
(74) *Attorney, Agent, or Firm* — Dickinson Wright PLLC

(57) ABSTRACT

A technique is disclosed to realize the change of session seamlessly and with high degree of freedom while reducing the increase of the processing load on a session control server upon a request to change the session from a terminal and to decrease the load on network traffic. According to this technique, trigger information is embedded in a session of content used by the terminal. When this trigger information is detected, the terminal carries out an operation to set up as trigger action (e.g. the change to another session). The relation between the trigger information and the trigger action may be described in sequence information, which is held by the terminal in advance or the trigger action may be described in the trigger information. With regard to certain trigger information, different types of trigger actions may be set up for each terminal (or, depending on the condition of the terminal). As a result, different types of session change can be performed, depending on each terminal and on the conditions of the terminals.

18 Claims, 12 Drawing Sheets

(56) References Cited

U.S. PATENT DOCUMENTS

| | | | |
|---|---|---|---|
| 7,600,026 B2* | 10/2009 | Chen et al. | 709/227 |
| 2004/0243715 A1 | 12/2004 | Yokoyama | |
| 2006/0187926 A1 | 8/2006 | Imai | |
| 2009/0122794 A1* | 5/2009 | Wu et al. | 370/352 |

OTHER PUBLICATIONS

3GPP TSG 23.402 V 1.4.0, "Technical Specification Group Services and System Aspects; Architecture Enhancements for non-3GPP accesses," Release 8, Oct. 2007, 125 pages total.

* cited by examiner

SESSION CHANGE METHOD AND SESSION CHANGE DEVICE

TECHNICAL FIELD

The present invention relates to a session change method and a session change device, by which it is possible to change the session at each of user terminals.

BACKGROUND ART

Currently, with the progress and the improvement of technology, amount of information and amount of data of the content to be distributed from network side to a terminal (hereinafter referred as UE (User Equipment)) are rapidly increasing. Also, a technique is now growing popular to provide information to the users by combining different types of media together (media mix). Further, a system is known, which provides the content to each of the terminals by mutually changing the content at real time. In various types of communication service and user-participating type system, attempts are being made on coordination and unification of real-time broadcasting communication.

To operate in a system as such, UE is now capable to perform both the communication and the receiving of broadcasting. UE is so designed that a plurality of sessions can be managed and changed. As the technique to carry out the management of a plurality of sessions and to perform synchronizing processing, the techniques as disclosed in the following Patent Documents 1 and 2 are known.

For instance, the Patent Document 1 discloses a technique to carry out the session change to be executed and to maintain the application of a certain terminal while the application is carried out. Also, the Patent Document 2 discloses a technique of session mobility to shift a specific session at a certain terminal to another terminal.

Further, in the Non-Patent Document 1 as given below, SMIL (Synchronized Multimedia Integration Language) is disclosed, which describes a media synchronizing method on application layer. SMIL is a technology to synchronize by controlling reproduction of multimedia object (multimedia expression by descriptive language based on XML (Extensible Markup Language). According to SMIL, objects are specified by hyperlink. By describing time-related behavior of the objects to be synchronized (to display as to at which timing and how long) or layout (to which position it is to be displayed), well-synchronized multimedia objects can be reproduced.

PRIOR ART DOCUMENT

Patent Document

[Patent Document 1] Japanese Patent Application Publication No. JP2006-237815 A (Paragraphs [0008] and [0009])
[Patent Document 2] Japanese Patent Application Publication No. 2007-104163A (Paragraphs [0039]-[0051])

Non-Patent Document

[Non-Patent Document 1] Synchronized Multimedia Integration Language (SMIL 3.0), W3C Recommendation 1 Dec. 2008

In the prior art (e.g. in the technique disclosed in the Patent Documents 1 and 2), when a terminal changes session, a request to change the session is sent from the terminal to a session control server, and the session control server performs control to change the session to the content server according to this request. Therefore, when a number of sessions are present (e.g. in case there are a number of terminals or in case the terminal sets up a number of sessions), there are such problems that the load on the session control server is increased (this may exceed the processing ability of the session control server). Also, in case a number of terminals set up sessions of broadcasting/multicasting, and in case the change relating to the session is to be performed, the requests to change the session from a number of terminals to the session control server are concentrated within the same time period. As a result, the load on the session control is extremely increased (further, the load on the network traffic is increased).

For instance, it is supposed here that various types of contents are distributed from network side to a plurality of terminals (UE) 910 as shown in FIG. 8. In FIG. 8, the content is distributed from a content server 930 via medium such as Internet (identifier α in FIG. 8) and the content is distributed from a content server 930 via a broadcasting network 940 such as television broadcasting or radio broadcasting (identifier β in FIG. 8). Also, it is supposed that the content is distributed from a content server 930 via a 3G network (cellular phone network) 950 and that it is performing communication with another UE 910 (identifier γ in FIG. 8).

In this case, for instance, each time UE 910 performs the change of the content, the session control server 920 must receive a request to change the session from UE 910 and perform the processing and must carry out the session change control to the content server 930. Also, there are a number of UEs 910, and the request for session change from these UEs 910 must be processed. When the requests of the session changes are received within the same time period from a number of UEs 910, various types of the processing on the request of the session change are concentrated within short time, and the load is increased.

In case of UEs 910 where the requests on the session request are the same (e.g. UEs 910 viewing the same content) and are put together into a group, and only UE 910, which represents this group, transmits the request for the session change to the session control server 920, the processing load of the request on the session change at the session control server 920 can be decreased. However, UE 910, which belongs to a certain group, cannot use only the content of the session to be changed in this group, and this means that the degree of freedom to use the content individually by each of UEs 910 is decreased.

In case the technique disclosed in the Non-Patent Document 1 is applied, a structure to branch off the content can be attained through the description by XML language, and each of the different terminals can view different content. Also, the request on the session control server (on network side) is decreased, and the load on the network side is also reduced. However, a plurality of media are operated in synchronization according to a predetermined scenario, and it is not possible to cope with the case where anomalous content are offered at real time such as the case of communication or broadcasting (a case where the time required for continuation of the session is extended irregularly or troubles such as breaking-in may occur).

SUMMARY OF THE INVENTION

To solve the problems as described above, it is an object of the invention to provide a session change method and a session change device, by which it is possible to realize the change of the session seamlessly and with high degree of freedom while preventing the increase of the processing load on the session control server caused by the request to change the session from terminals, and it is possible to reduce the load on the network traffic.

To attain the object as described above, the present invention provides a session change method to be carried out when a communication device setting up a session with a content server on a content distribution side changes the session to a different session, said session change method comprising:

a trigger information notifying step in which said content server notifies said communication device of trigger information to get said communication device to change the session currently set up to the different session;

a trigger information receiving step in which said communication device receives said trigger information; and a session changing step in which said communication device changes said session according to said trigger information.

As a result, it is possible to accomplish the change of the session seamlessly and with high degree of freedom, while preventing the increase of the processing load on the session control server caused by the request to change the session from the terminal, and the load to the network traffic can be reduced.

Also, to attain the object as described above, the invention provides a session change device for changing a session as set up with a content server on a content distribution side to a different session, said session change device comprising:

means for receiving, from said content server, trigger information to get said session change device to change the session currently set up to the different session; and means for changing said session according to said trigger information.

With the arrangement as described above, it is possible to accomplish the change of the session seamlessly and with high degree of freedom, while preventing the increase of the processing load on the session control server caused by the request to change the session from the terminal and the load to the network traffic can be reduced.

Further, with the arrangement as described above, it is possible to accomplish the change of the session seamlessly and with high degree of freedom, while preventing the increase of the processing load on the session control server caused by the request to change the session from the terminal and the load to the network traffic can be reduced.

DESCRIPTION OF EMBODIMENTS

Description will be given below on an embodiment of the invention by referring to the attached drawings.

Figure 1:
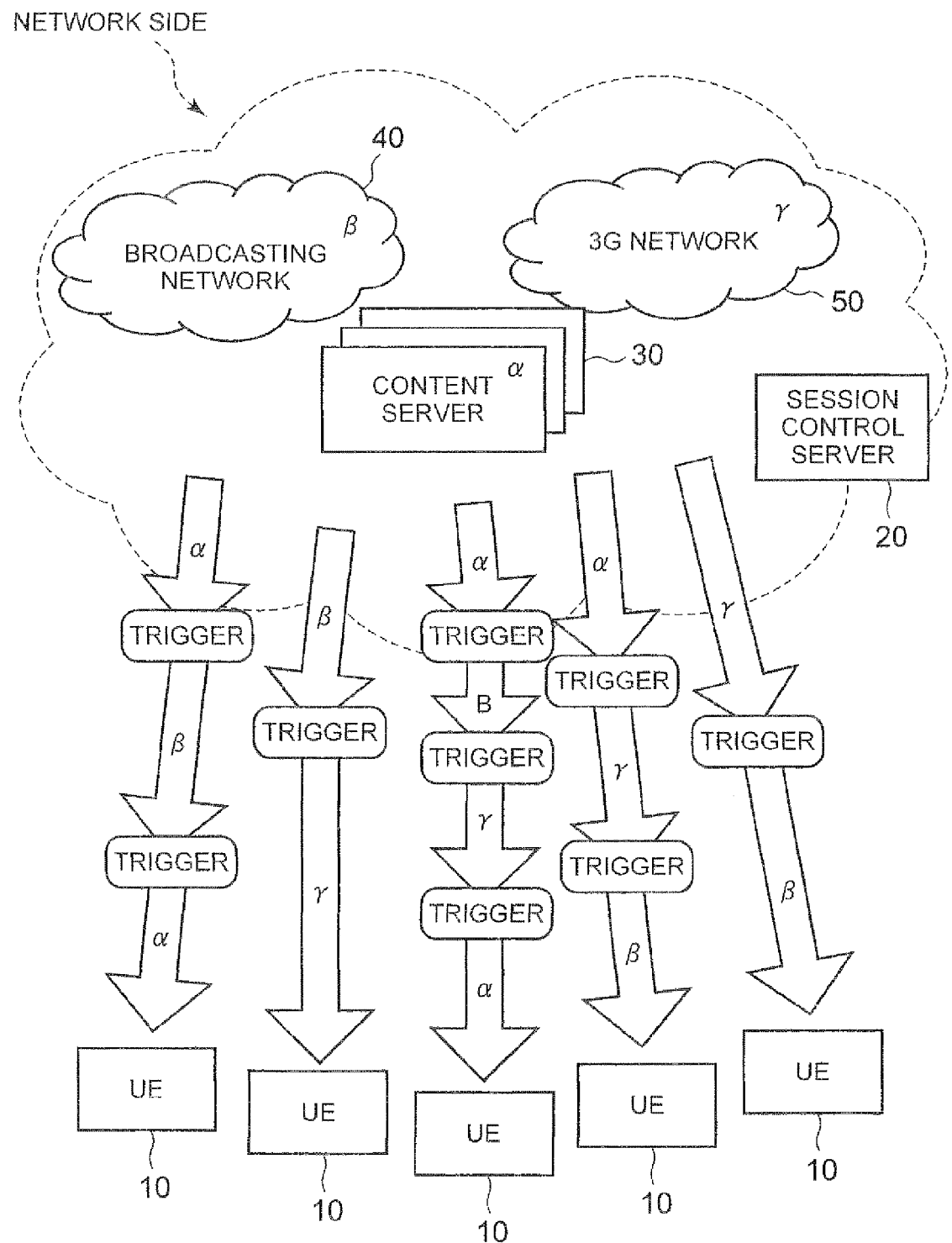
FIG. 1 is a schematical drawing to show a system arrangement to explain basic concept of the present invention.

First, referring to FIG. 1, description will be given on basic concept of the invention. FIG. 1 is a schematical drawing to show a system arrangement to explain the basic concept of the invention.

FIG. 1 schematically shows a condition where a plurality of UEs 10 to use contents from network side. Various types of contents distribution mechanism may be present on the network side. FIG. 1 shows a case where the contents are distributed from a contents server 30 via media such as Internet (identifier α of FIG. 1), a case where the contents are distributed from the content server 30 via television broadcasting, radio broadcasting, etc. through a broadcasting network 40 (identifier β of FIG. 1), and a case where the contents are distributed from the content server 30 via a 3G network (cellular phone network) 50 and communication is performed with another UE 10 (identifier γ of FIG. 1). The present invention can cope with various types and conditions of the contents, and various types of contents such as broadcasting, streaming upload, download, communication (voice/image/projected image), etc. may be mixed together.

Also, a session control server 20 is installed on the network side, and by this session control server 20, controlling such as starting, stopping, changing, etc. of the session on the network side used by UE 10 and the control of the session to the content server 30 or a communication network can be carried out. In the embodiment of the invention, the sessions are roughly divided to various types of cases, depending on nature of the session: session for communication (with data path running bidirectionally and at real time), a session for broadcasting (main data path is terminal-directed, at real time or at non-real time), and session for upload (main data bus is for network, at real time or at non-real time).

When the content is distributed to UE 10, there are the cases where different contents are distributed for each of different UEs 10 or there are the cases where the same content are distributed to a plurality of UEs 10 (or all of UEs 10). Each UE 10 can use the content distributed from the network side, and further, can change the content to be used.

According to the present invention, trigger information to change the content is embedded in the content itself or in the data in the communication session. In the description given below, it is described that trigger information is included in the content (or session), and this expresses the cases where an arbitrary data is to be sent when trigger information is transmitted from the network side (including a content, session, communication data, etc.).

The trigger information is a type of information to indicate the timing for the change of the content. This may include only a mere ID information, or it may contain a type of information to specify the content of the destination of the change, or information as to how to handle the content before the change after the content has been changed (such as holding or cancelling), etc.

According to the present invention, a sequence of the content change (sequence information) is set up to meet the content to be provided by a content server 30, a session control server 20 or an additional network side device, etc., and trigger information to be inserted into the content is generated. Then, the sequence information is delivered to UE 10 from the network side, and UE 10 specifies a trigger action to match the trigger information included in the content in use and performs the processing of the change of the content according to the trigger action. In this case, it is desirable that the session control server 20 comprehends and identifies a scenario (i.e. sequence) of the content distribution, and that synchronized processing is carried out by indicating the timing to insert the trigger information and the timing to start the distribution of the content. However, it is not necessarily required that the session control server 20 is set up in case each content server 20 grasps scenario of the distribution of the content as necessary (i.e. a case where each content server 30 has the function of a session control server 20) or in case the content where the trigger information is embedded in fixed condition is prepared and distributed.

In the present invention, it may be so arranged that trigger information to match an event to a specific UE 10 or a group of specific UEs 10 (i.e. the change of the content to be offered) may be inserted—not at a fixed position but at a position to match the stream of the content. Specifically, the trigger information may be inserted into the content at the time of fabrication of the content or the content server 30, or the session control server 20 may adequately insert the trigger information into the content. As a method to deliver the sequence information from the network side to UE 10 or a type of information included in the trigger information, there may be various cases as to be described below. That is, a method is used to deliver the sequence information from the network side to UE 10 or a type of information is included in the trigger information. A case where the trigger information merely comprises ID information only (the first example as to be describer later), or a case where a trigger action based on the sequence information is included in the trigger information (the second example as described below), or a combination of these cases.

Figure 2:
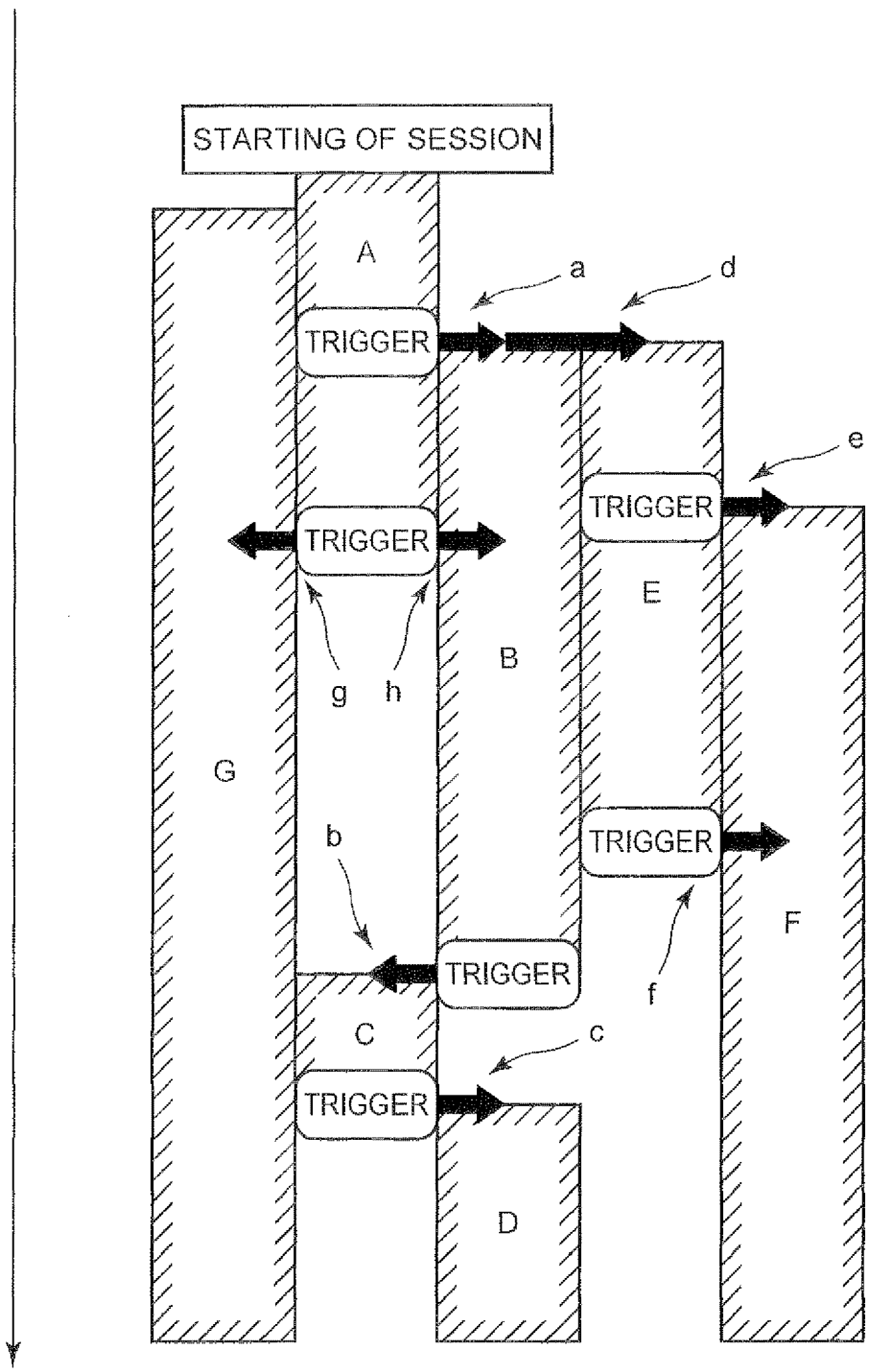
FIG. 2 is a schematical drawing to show an example of an aspect where a content is changed by trigger information in an embodiment of the invention.

Next, by referring to FIG. 2, description will be given below on an aspect where the change of content is carried out according to the trigger information. FIG. 2 is a schematical drawing to show an example of an aspect where the change of content is performed according to the trigger information in an embodiment of the present invention.

In FIG. 2, it is supposed that a certain UE 10 starts a session to use the content. In this case, a session A is set up at UE 10. In case the trigger information embedded in the session A is detected, UE 10 performs the change to another session B according to this trigger information (symbol "a" in FIG. 2). Further, when the trigger information embedded in the session B is detected while the session B is set up, UE 10 carries out the change to another session C according to this trigger information (the symbol "b" in FIG. 2). Further, in case the trigger information embedded in a session C is detected under the condition that the session C is set up, UE 10 performs the change to another session according to this trigger information (a symbol "c" in FIG. 2). In this way, UE 10 carries out the change of sessions each time the trigger information is detected.

Also, the content at the destination of the change may not necessarily be fixed by the trigger information. For instance, a certain UE 10 carries out the change to another session B when the trigger information embedded in the session A is detected. On the other hand, in the case of another UE 10, which receives the same trigger information, it may be so arranged that the change to another session E may be performed according to this trigger information (the symbol "d" in FIG. 2). When UE 10 changes the session E, it detects the trigger information embedded in the session E, and further, performs the change of another session F (the symbol "e" in FIG. 2).

For a certain UE 10, the trigger information is a type of information to indicate the change of the session, while, it may be so designed, for another UE 10, that this trigger information becomes meaningless information (a type of information, which does not cause the change of the session). As described above, when UE 10, which has changed the content to the session E (as indicated by the symbol "d" in FIG. 2), detects the trigger information embedded in the session E, it carries out the change to another session F (the symbol "e" in FIG. 2). On the other hand, it may also be so arranged that, in case of another UE 10, the change to the session F can be executed by detecting the next trigger information (the symbol "f" in FIG. 2), and that it continues to set up the session E without making transition as indicated by the symbol "e" in FIG. 2. Similarly, it may be so arranged that UE 10, which has set up the session A, continues to set up the session A without executing transition as shown in FIG. 2 even when it detects the trigger information and can change to another session B or the session G (the sessions of the destination of the change may be different, depending upon each UE 10) (the symbol "h" and the symbol "g" in FIG. 2). As to what kind of action should be taken by each of UEs 10 to the trigger information may be decided according to the sequence information, which UE 10 holds in advance (the first example as to be described later), or that the trigger action is embedded in the trigger information, and it may be decided according to this trigger action (the second example as to be described later).

(The Arrangement of the Terminal)

Figure 3:
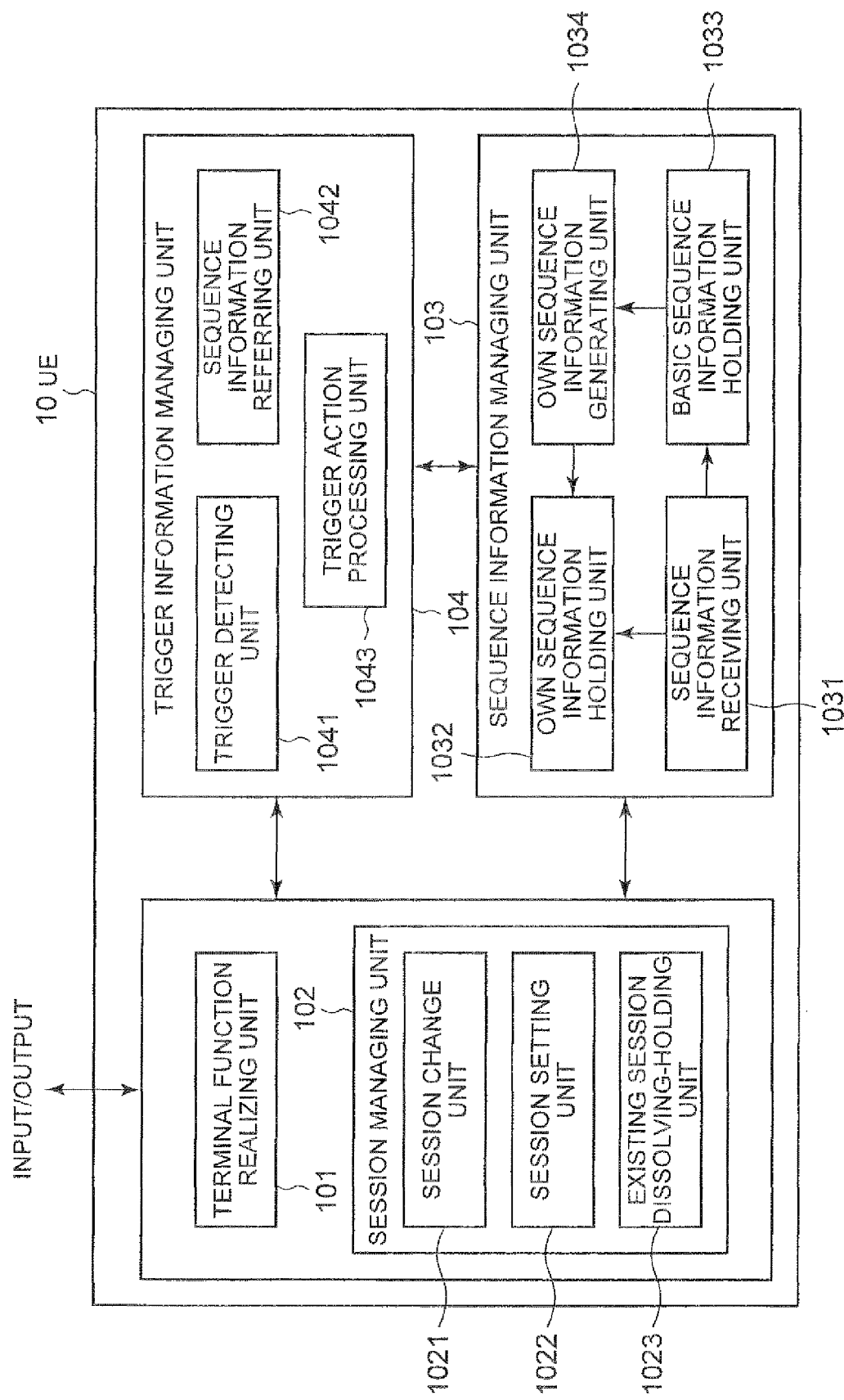
FIG. 3 is a schematical block diagram to show an example of an arrangement of UE in the embodiment of the invention.

FIG. 3 is a block diagram to show an example of an arrangement of UE 10 in the embodiment of the invention. UE 10 as shown in FIG. 3 has four major functions: the functions of each of a terminal function realizing unit 101, a session managing unit 102, a sequence information managing unit 103, and a trigger information managing unit 104.

The terminal function realizing unit 101 is a block to fulfill a terminal function, which a conventional type UE 10 possesses. A part of the functions according to the present invention can be fulfilled by this terminal function realizing unit 101. In order to give the explanation on the function of the invention more clearly, the explanation will be separately given here: the explanation on the terminal function realizing unit 101 and the explanation on the functions according to the invention.

The session managing unit 102 has the function to perform the management of the sessions, and it comprises a session change unit 1021, a session setting unit 1022, and an existing session dissolving-holding unit 1023.

The session change unit 1021 has a function to perform the actual change of the session. The session change unit 1021 performs operation to change an actual session from an existing session (i.e. a session already set up) to a new session. The session change unit 1021 performs the change of the session according to a trigger action notified from the trigger action processing unit 1043, for instance. Here, it is supposed that the tuning of channel where a content for broadcasting is used is also treated as a session change in broad sense. The operation of the change of actual session to be performed by the session change unit 1021 is almost the same as an operation, which has been conventionally performed.

The session setup unit 1022 has a function to set up the session. For instance, the session setup unit 1022 receives a notification when a session must be set up as a trigger action in advance, and it sets up the session according to the notification.

The existing session dissolving-holding unit 1023 has information relating to an existing session or the function to hold or to dissolve an existing session. When the change is performed from an existing session to a new session, and if there is a possibility that this existing session is to be set up again later (to return to the existing session again), the existing session dissolving-holding unit 1023 holds the context relating to this existing session. On the other hand, in case this existing session is to be dissolved, the existing session dissolving-holding unit 1023 cuts off the session and revokes and abandons the context.

The sequence information managing unit 103 has a function to manage the sequence information, and it comprises a sequence information receiving unit 1031, an own self-sequence information holding unit 1032, a basic sequence information holding unit 1033, and an own sequence information generating unit 1034.

The sequence information receiving unit 1031 has a function to receive sequence information from an arbitrary device (e.g. the session control server 20). The sequence information contains identification information or change timing information, which each of UEs 10 should change, and this corresponds to a table of programs of the session.

The own sequence information holding unit 1032 has a function to hold sequence information to change the sessions at each of UEs 10. When the own sequence information is received at the sequence information receiving unit 1031, it is held and maintained at this own sequence information holding unit 1032. In the own sequence information, it is described as to which kind of operation is to be performed at the UE 10 when trigger information is received. In the own sequence information, an operation to return to a previous session may be set in advance in case EOS (End of Sequence) or EOF (End of File) is detected, for instance. When it is necessary to discriminate the trigger information, an operation relating to the identification information of each type of trigger information may be described.

The basic sequence information holding unit 1033 has a function to hold basic sequence information. When the basic sequence information is received at the sequence information receiving unit 1031, it is held and maintained at this basic sequence information holding unit 1033. Operation at each of the UEs 10 is prescribed in the own sequence information as described above, while, in the basic sequence information, various type of information relating to all of the sessions where own sequence information can be prepared are contained in all of the UEs 10.

Further, the own sequence information generating unit 1034 has a function to extract a sequence to be received by the UE 10 from a type of basic sequence information as held by the basic sequence information holding unit 1033, and to generate own sequence information. The own sequence information generated from the basic sequence information at the own sequence information generating unit 1034 is held by the own sequence information holding unit 1032.

Here, it is described and shown that the own sequence information and the basic sequence information are to be held as the types of information different from each other, while it may be designed that the own sequence information and the basic sequence information may be summed up by describing a type of information to be held as the own sequence information in the basic sequence information, for instance. Also, an arbitrary format may be used in the own sequence information and the basic sequence information. For instance, it may be given by a list including the trigger information and trigger actions to match the trigger information. In case the trigger actions are included in the trigger information (this corresponds to the second example as to be described later), the sequence information is not needed, and no processing is performed at the sequence information managing unit 103.

The trigger information managing unit 104 has a function to perform the management of the trigger information, and it comprises a trigger detecting unit 1041, a sequence information referring unit 1042, and a trigger action processing unit 1043.

The trigger detecting unit 1041 monitors the trigger information contained in an existing sessions, and when the trigger information is discovered, it has a function to notify the trigger information to the trigger action processing unit 1043 so that a trigger action to match this trigger action will be carried out.

The sequence information referring unit 1042 has a function to refer to the sequence information (own sequence information or basic sequence information) in response to an inquiry from the trigger action processing unit 1043 and to notify a trigger action to match the trigger information to the trigger action processing unit 1043.

The trigger action processing unit 1043 has a function to carry out a trigger action corresponding to the trigger information as detected by the trigger detecting unit 1041. The trigger action processing unit 1043 notifies a trigger action corresponding to the trigger information to the session change unit 1021 so that the trigger action will be carried out. In case the trigger information detected by the trigger detecting unit 1041 is identification information, it requests the sequence information referring unit 1042 corresponding to this identification information to retrieve. Then, the result of retrieval (i.e. a trigger action) is notified to the session change unit 1021 (corresponding to the first example to be described later). On the other hand, in case a trigger action is included in the trigger information, this trigger action is notified to the session change unit 1021 (corresponding to the second example to be described later).

The First Example

A Case Where the Trigger Action is Included in the Sequence Information

Figure 4:
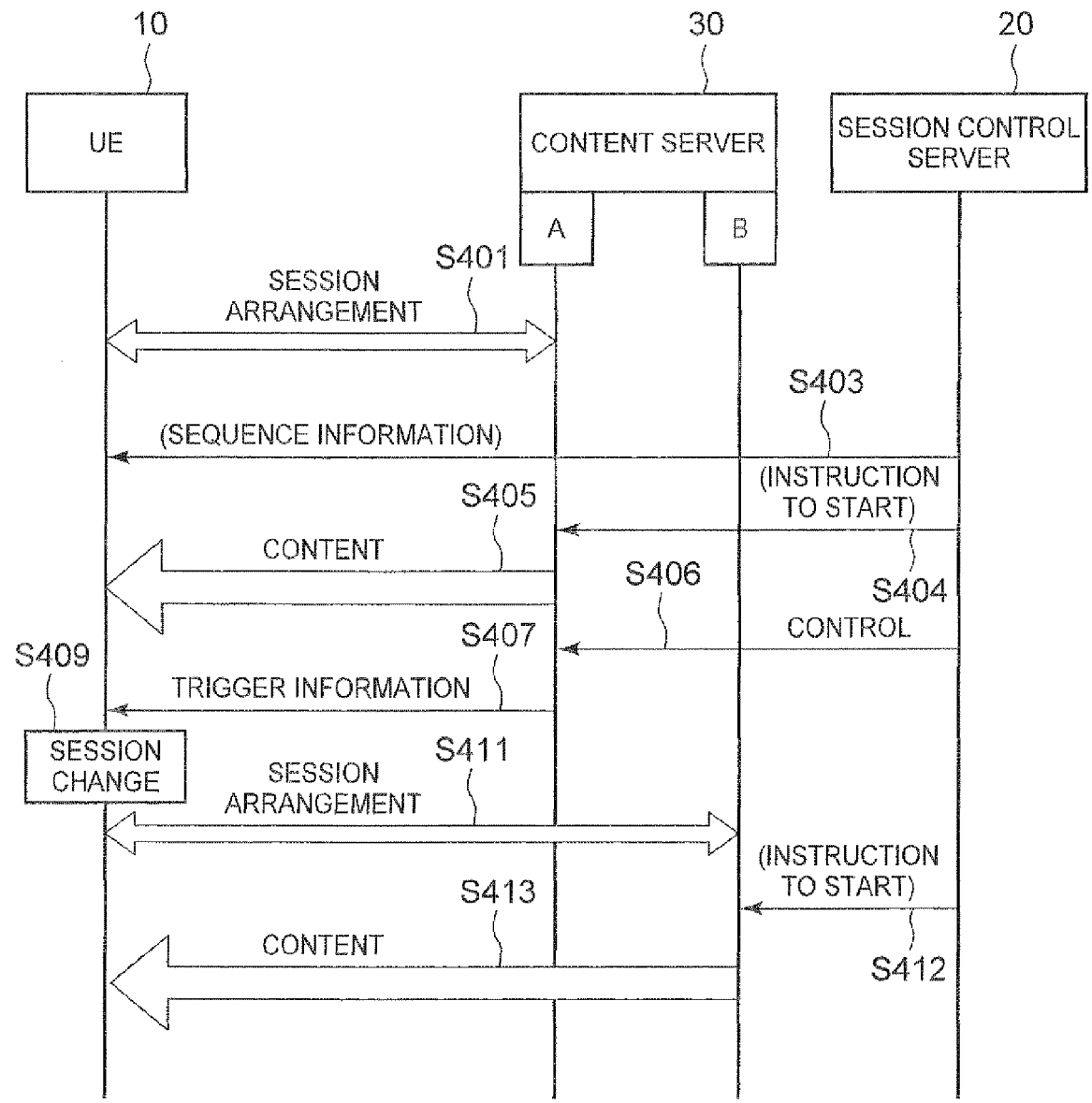
FIG. 4 is a sequence chart to show a first example in the embodiment of the invention.

Next, description will be given below on a case where the trigger information is a simple type of information (e.g. in case it contains only ID information) as the first example in the embodiment of the invention. FIG. 4 is a sequence chart to show the first example in the embodiment of the invention. Here, an example is taken on a case where a session as set up between UE 10 and a content server (A) 30 is changed to a session between UE 10 and a content server (B) as an example. As described above, the content server 30 can distribute the content from an arbitrary point on the network side to UE 10 via an arbitrary medium. Here, description will be given on the change of session between different content servers 30, while similar action may be taken on the change of different sessions to be offered by the same content server 30.

In FIG. 4, UE 10 first establishes a session between the content server (A) and UE 10 (Step S401). Then, UE 10 receives sequence information from the network side (Step S403). Although the session control server 20 transmits the sequence information to UE 10 in FIG. 4, the content server 30 or other network side node may transmit the sequence information to UE 10, or the sequence information may be held in advance at UE 10 as static information. Also, in FIG. 4, it is shown that the sequence information is notified to UE 10 from the network side after the arrangement of the session (after the processing of Step S401), while it may be transmitted before the arrangement of the session, or the sequence information may be notified during the process of distribution of the content. Also, it is supposed here that a trigger action to change the session to the content server (B) 30 is described in the sequence information to correspond to a certain trigger information T.

In the first example given in the embodiment of the invention, at least the identification information to indicate the trigger information and the processing operation to be performed to match the trigger information (trigger action) are described in the sequence information to be held by UE 10. In the trigger action, a type of information to specify the session to be changed next (and an instruction to change to this session) are described. For instance, an instruction to return to the session as set up at the session before the previous session or an instruction to terminate the procedure may be described. Also, as to be described later, when various types of additional information are described in each of the trigger actions, it is possible to designate more detailed session change operation.

After the session arrangement is carried out between UE 10 and the content server (A) 30, the content is distributed from the content server (A) 30 to UE 10 (Step 3405). In this case, the session control server 20 is performing synchronization management, and an instruction to start the distribution of the content from the session control server 20 to the content server (A) 30 may be sent (Step 3404). An arrow mark to indicate the distribution of the content in Step S405 of FIG. 4 indicates the starting of distribution of the content, and the distribution of the content in Step S405 will be continuously performed thereafter (until the change of the session in Step S409).

Then, the session control server 20 controls the content server (A) 30 so that adequate trigger information (i.e. the trigger information T where the operation of the change of the session to the content server (B) 30 is associated) is embedded in the content at an adequate timing based on the sequence information (Step S406). The content server (A) 30 embeds an adequate part of the content (i.e. a part of the change to be changed to the content distributed from the content server (B) 30 in case of the content to be distributed from the content server (A) 30) (Here, it means the content server (B) 30.) Then, it is transmitted to UE 10 (Step S407). In case the trigger information is embedded in the content in advance, the content server (A) 30 has no need to perform the processing to embed the trigger information.

When the trigger information is detected in the content currently in use, UE 10 refers to the sequence information currently held and carries out the trigger action to correspond to this trigger information. More concretely, UE 10 starts the trigger action (i.e. the change of the session to the content server (B) 30) as detected from inside the content now in use (Step S409).

Then, after the session is established between UE 10 and the content server (B) 30 (Step S411), UE 10 uses (receives) the content as distributed from the content server (B) 30 (Step S413). In this case, similarly as the procedure in the Step S404 as described above, an instruction to start the distribution of the content may be sent from the session control server 20 to the content server (B) 30 (Step S412). When the sessions are changed, UE 10 may continue to hold the session before the change (i.e. the session to the content server (A) 30) or may dissolve it.

As described above, in the first example in the embodiment of the invention, UE 10 holds the sequence information in advance where the trigger action to correspond to the trigger information is described, and, when the trigger information embedded in the content from the content server 30 is detected, UE 10 can induce a trigger action from the trigger information by referring to the sequence information. For instance, the operation of the change of session can be carried out at adequate timing.

The Second Example

A Case Where the Trigger Action is Included in the Trigger Information

Figure 5:
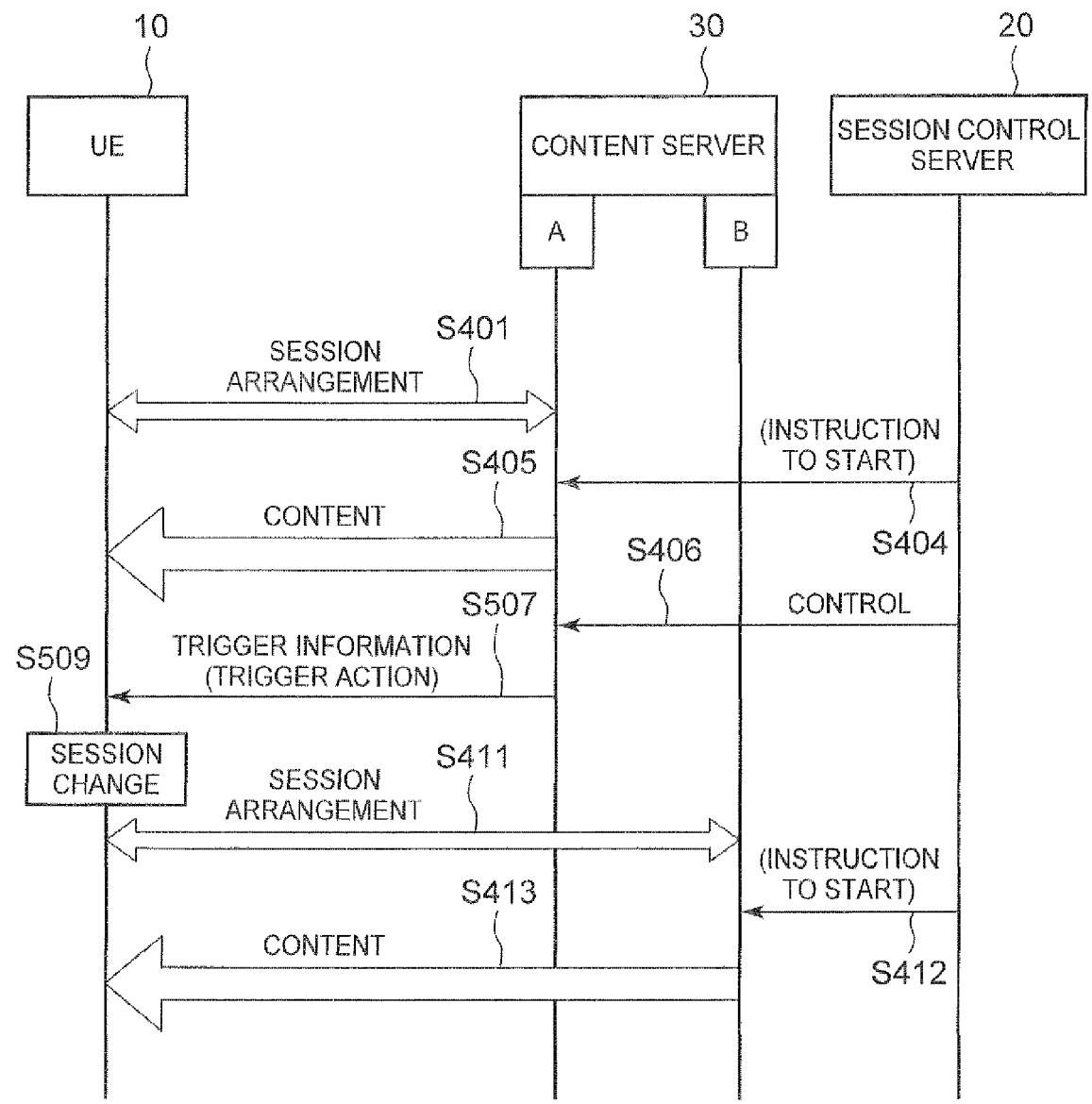
FIG. 5 is a sequence chart to show a second example in the embodiment of the invention.

Next, as the second example of the embodiment of the invention, description will be given below on a case where the trigger action is also notified at the same time in addition to the trigger information. FIG. 5 is a sequence chart to show the second example in the embodiment of the invention. For the processing used as common with the processing shown in the sequence chart in FIG. 4, the detailed description is not given here.

As shown in FIG. 5, UE 10 first establishes a session between UE 10 and the content server (A) 30 and uses (receives) the content from the content sever (A) (Steps S401, S404, and S405). Unlike the first example as shown in FIG. 4, in the second example shown in FIG. 5, there is no need that the processing is performed (the processing of Step S403 in FIG. 4) to notify the sequence information from the network side to UE 10 in advance).

According to the procedure of the control from the session control server 20 (Step S406), the content servers (A) 30 embeds the trigger information as described in the trigger action to be performed at UE 10 (here, the change of session to the content server (B) 30) to an adequate part of the content (i.e. a part for the change of the content distributed from the content server (A) 30 to be changed to the content to distribute it from the content server (B) 30) and transmits it to UE 10 (Step S507).

When the trigger information is detected in the content now in use, UE 10 performs the trigger action included in this trigger information. More concretely, UE 10 starts the trigger action included in the trigger information as detected from the content in use (the change of the session to the content server (B) 30) (Step S509).

After establishing the session between UE 10 and the content server (B) 30, UE 10 uses (receives) the content to be distributed from the content server (B) 30 (Step S413). In this case, similarly to the procedure in Step S404 as described above, an instruction to start the distribution of the content from the session control server 20 to the content server (B) 30 may be sent (Step S412). When the sessions are changed, UE 10 may continue to hold the session before the change (i.e. the session to the content server (A) 30) or may dissolve it.

As described above, in the second example of the embodiment of the invention, in the trigger information to be embedded in the content from the content server 30, a trigger action corresponding to the trigger information is described. Therefore, when UE 10 detects the trigger information, UE 10 can induce the trigger action from the trigger information, and this makes it possible to perform operation such as the change of the session at adequate timing, for instance.

In the description as given above, explanations are given separately on the first example and on the second example in the embodiment of the invention, while it is possible to build up a system where UEs 10 are present in mixed manner to perform the operations relating to the first example and the second example. It is also possible to that a single UE 10 performs operation relating to both of the first example and the second example.

(Trigger Information, Trigger Action, and Sequence Information)

Next, description will be given below on trigger information, trigger action, and sequence information in the embodiment of the invention.

First, description will be given on trigger information, trigger action and sequence information in the case of the first example as given above. In the case of the first example as given above, the trigger information can be realized basically by some types of identification information as set up to correspond to the trigger action. Also, in the case of the first example as given above, a trigger action corresponding to the trigger information (corresponding relation between the trigger information and the trigger action) is described in the sequence information.

In the case of the first example as given above, it is necessary to receive the sequence information to change the content in advance, (i.e. until the time of starting the session or before the time when the related trigger information at least reaches there). In case the basic sequence information to be sent to a plurality of UEs 10 (including the information not for itself, and the information to be selected by a plurality of options) are received from the network side, the sequence needed by itself (i.e. the sequence, which the UE 10 wants to receive) is extracted from the basic sequence information, and own sequence information is prepared. The standards for selection of the sequences to be extracted when own sequence information is prepared from the basic sequence information can be determined according to the conditions of UE 10 (including the conditions dynamically changed during the receiving of the content such as the position of UE 10 and the quality of communication), preference of the user, input of the user, etc. In some cases, own sequence information may be received from the network side.

In the case of the first example as given above, the trigger action is described in the sequence information associated with the trigger information. When UE 10 detects the trigger information, which has an amount of information such as identification information, it refers to the sequence information as it comprehends and finds out what type of operation (i.e. preparatory operation of the session (setting operation of the session) or operation to change the session) should be carried out to find out the trigger action, prescribing as to which session the operation should be performed. Specifically, UE 10 judges its own next action (trigger action) by using the trigger information currently flowing in during the session. Each of UEs 10 can set up different trigger actions at each of UEs 10, and different operations can be carried out for each of UEs 10 with respect to a single type of trigger information. Also, it is prescribed that a plurality of trigger actions (where the condition of selection, or operation or effects when the selection is made may be described as additional information), and UE 10 may selectively take one or more trigger actions from these trigger actions.

In the case of the first example as given above, the trigger information is realized by the identification information. As a result, it is possible to decrease to the amount of data of the trigger information. Also, UE 10 can make preparation for the change of the session by comprehending the sequence where the standard of selection and the like are taken into account in advance. Thus, through simple operation by merely performing the trigger action to match the trigger information, the change of the sessions can be quickly carried out by simple operation.

On the other hand, in the case of the second example as given above, the trigger action itself is described in the trigger information, and UE 10 has no need to hold the sequence information.

In the case of the second example as given above, UE 10 can perform the trigger action by accepting all of the trigger actions described in the detected trigger information. Also, it is possible to perform only the trigger action, which matches a specific type of trigger information. For instance, a type of information to indicate which of the terminals it should be directed may be described in the trigger information, and UE 10 itself can judge whether it corresponds to the terminal as indicated by this trigger information or a plurality of operation (a plurality of trigger actions) are described in a single type of trigger information, and it is possible to judge which of the options can be preferably selected. As a result, it can be so arranged that each of UEs 10 can select different types of operation with respect to single trigger information.

In case the amount of information included in the trigger information is plenty and the amount of processing such as judging processing relating to the trigger information is increased, considerable time may be required until the trigger actions will be completely performed. By taking such possibility into account, the timing to start actual action may be described in the trigger information (e.g. one of two sessions is selected, and the change is made to the session selected after 5 seconds).

In the case of the second example as given above, various types of trigger actions can be described in the trigger information, and the change of the session can be carried out dynamically and flexibly.

Also, it is possible to use the existing information instead of the trigger information. For instance, with regard to the broadcasting content, it may be difficult to directly insert the trigger information into the content in some cases. In such case, it may be useful to adopt a method to use the existing information as the trigger information. For instance, the trigger action to correspond to the information such as EOS (End of Sequence) or EOF (End of File) to indicate the end of the content is prescribed in the sequence information. As a result, the trigger action can be carried out at the time of detection of the existing information even for the content, to which specific trigger information cannot be inserted. Also, it is possible to use time information instead of the trigger information.

According to the present invention, the trigger information can be inserted in the content (to match the conditions of the content). As a result, not only the broadcasting content where programs (time table) are determined, but also when the other types of media (including communication session) are to be handled, and the load on the session control server can be reduced. Further, by using the sequence information, it is possible to use the change of the conditions in the existing types of media as a trigger. In addition, depending on the conditions of the terminal (such as the quality of communication, position moving speed, etc.) or to match the preference of the user, it can be expanded to such an extent that the change of the session can be instructed to carry out the change of the content (such as the change of bit rate, the change of arbitrary content and broadcasting content).

In the above, description has been given on a case where the download of the content is performed to UE 10 as premises, while the present invention can also be applied to a case where the upload of the content from UE 10 is performed. When a session, which mainly depends on the upload from UE 10, is used, UE 10 can insert the trigger information. This makes it possible to change the upload to another UE 10 in the middle of the course, or operation to change over the conditions on the transmitting side and on the receiving side at a single or a plurality of terminals as shown in an example of hierarchical type live relay system as to be described later, can be carried out smoothly. In case the trigger information can also be inserted on the terminal side, the degree of freedom or flexibility of the operation of the terminal can be improved in comparison with the case where the trigger information is inserted while giving due consideration on the timing of the change at the session control server on the network side.

(Additional Information of the Trigger Action)

Next, description will be given on the information, which is described as additional information to the trigger action in the embodiment of the invention. As the additional information where the trigger action can be described, various types of information can be used. The additional information to be described in the trigger action may be given in the trigger action included in the sequence is information (which corresponds to the first example as given above) or it may be described in the trigger action as included in the trigger information (which corresponds to the second example as given above). For instance, the following types of information can be described as the additional information.

As the additional information to be described in the trigger action, a type of information relating to the selection of camera angle may be used. When a plurality of contents from the network side are put together and it is offered as a single content in parallel (e.g. the case of multi-angle image or image with voice to correspond to multi-language voices on image, etc. are divided to a plurality of sessions), the trigger information is inserted into the content to be distributed from the content server 30, depending on the selection of camera angle or at a variable timing. When this trigger information is detected, UE 10 finds out the trigger action corresponding to the trigger information and refers to the additional information, and it recognizes that the camera angle can be selected, depending on the session. In this case, UE 10 can perform the change to the session relating to the camera angle as desired according to the input of the user based on the preference of the user.

As the additional information to be described in the trigger action, a type of information may be used, which indicates that it is UE 10 specifically selected. For instance, under the condition that a plurality of UEs 10 are using the content to be distributed via broadcasting or multi-casting (primarily receiving) in case the network side requests answer by giving question to a specific UE 10, a specific type of trigger information (the information to indicate that only a specific UE 10 is selected) is inserted into the content. Among a plurality of UEs 10, only a specific UE 10 can perform the trigger action to match this trigger information. When this specific UE 10 detects this trigger information, it finds out the trigger action to match the trigger information and refers to the additional information. Then, it recognizes that the UE 10 itself has been specifically selected, and performed the corresponding trigger action. The corresponding trigger action corresponds to the change of the session to a session, which is capable to transmit (transmit and receive). As a result, this specific UE 10 can give a reply to the question. When the participation of the user to the content has been terminated, it is desirable that UE 10 goes back to the original session (which is a session primarily engaged with the receiving). It may also be so arranged that a plurality of sessions are maintained as described above during the participation in the content, and the condition of the participation can be received in parallel (not the change of a complete session, but an addition of the session is carried out).

As the additional information to be described in the trigger action, such types of information as the status of the user or the condition depending on the status of the user or user input may be adopted. In this case, a plurality of trigger actions are interrelated with one trigger. Further, conditions such as status of the user or user input are described as the additional information to each of the trigger actions. When the trigger information has been detected, UE 10 performs the trigger action to match the state or input of UE 10, and these are branched off to different sessions, depending on the condition at each of UEs 10. By setting up the trigger actions as such, it is possible to provide multi-scenario (the scenario where the stories are branched off, due to various conditions such as selection of the user, the present location, the moving speed, the type of access network, etc., and the course in the middle of the way or the end of the story are guided to different contents) can be provided.

As the additional information to be described in the trigger actions, the information to indicate a method to handle the session before the change may be used. When UE 10 simply adds new session at the time of the change of the session, the number of the sessions to manage UEs 10 may be increased. In this respect, for the session, which is not used any more (with no possibility to turn back) when the change of the session is performed, by clearly indicating that the session should be released by additional information, UE 10 can promptly release the sessions, which are not needed any more. In case the session is automatically released at the time of the change of the session, there is no need to clearly indicate the release of the session by this additional information. Also, when the session is automatically released at the time of the change of the session, it may be so designed that the holding of a specific session is explicitly indicated by the additional information.

As the additional information to be described in the trigger action, the information to instruct to perform the change of wireless channel (frequency) where UE 10 is connected may be used at the same time as the change of the session (further, the information to specify the frequency of the destination of the change may be included). In this case, in order that the session may not be interrupted during a period necessary for the preparation of the change of wireless channel, the trigger information for the execution of the preparation of the change may be inserted before the insertion of the trigger information for actual change of the wireless channel (the change of the session), and both of an action to perform the preparation of the change and an action to carry out the changeover of wireless channel and session at the time as specified during the specified period may be instructed by a single trigger information. It is also possible to instruct the change not only to the channel (frequency) but also to UMTS (Universal Mobile Telecommunication System)/LTE (Long Term Evolution)/WiMAX (Worldwide Interoperability for Microwave Access)/WLAN (Wireless Local Area Network) (these are included in different frequencies in wider sense).

As the additional information to be described in the trigger action, multi-casting ID (e.g. service ID of MBMS (Multimedia Broadcast and Multicast Service)) or information such as a channel of tuner for the receiving of the broadcasting may be used. In case the multicasting ID is included in the additional information to be described in the trigger action, the participation to the specified multicasting is carried out. When the channel of the tuner for the receiving of the broadcasting is included, the change to a specific broadcasting is conducted. In the broadcasting content, it may be difficult to insert the trigger information (i.e. trigger information to indicate the change of the session from the broadcasting content). In such case, it is desirable that an action corresponding to the sequence information is specified by using the pause between programs or CM, the broadcasting time according to the program, the change of conditions of the program itself (details) as a trigger.

Here, description has been given that the additional information is described in the trigger action, while the additional information may be described in the trigger information.

Next, description will be given on an example of a system, to which the present invention is applied.

(Hierarchical Type Live Relay System)

Figure 6:
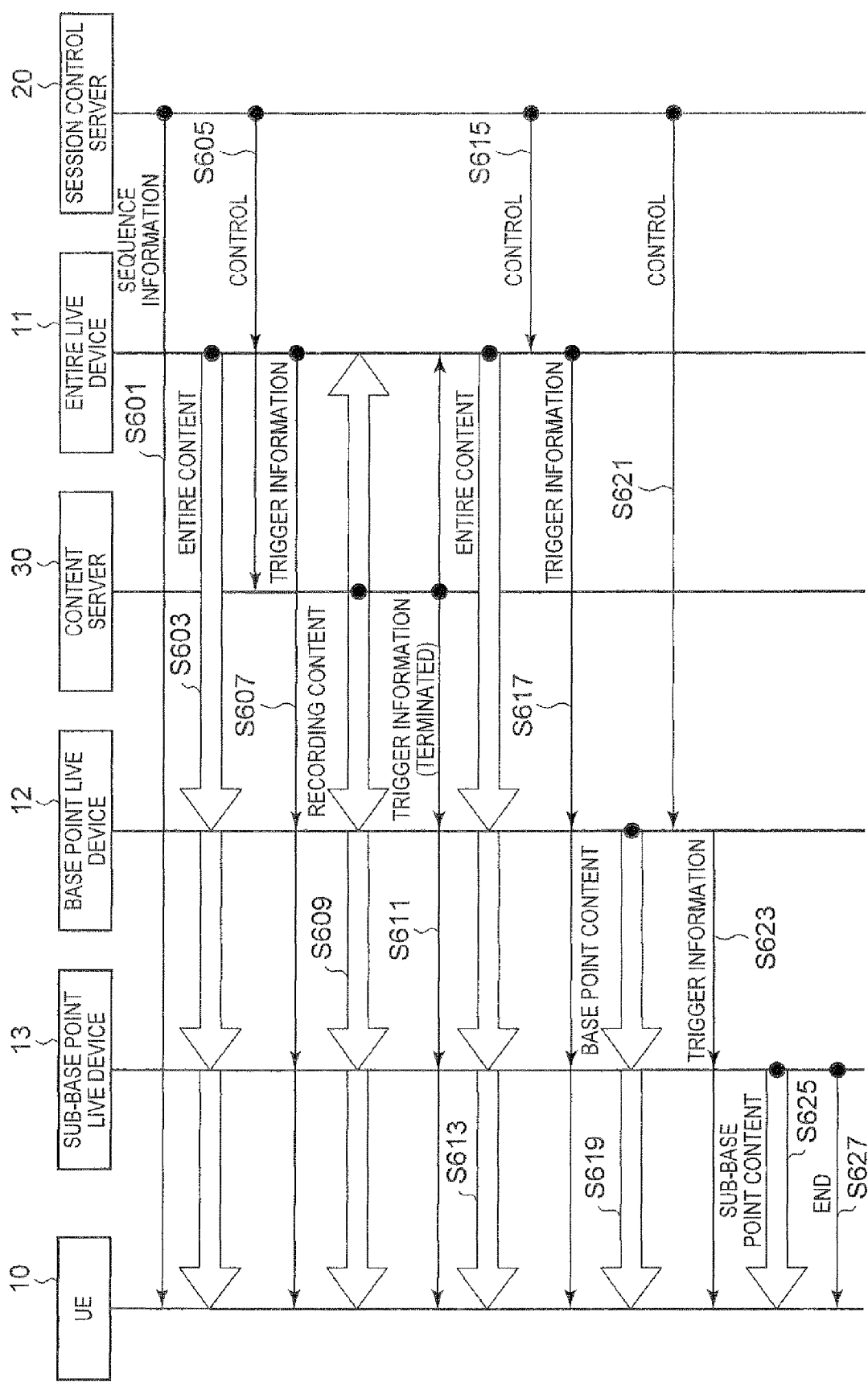
FIG. 6 is a sequence chart to show an example of operation in a hierarchical type live relay system designed by applying the present invention.

FIG. 6 is a sequence chart to show an example of operation in a hierarchical type live relay system, which is designed and constructed according to the present invention. In the hierarchical type live relay system, a live device is installed hierarchically. The live device has a function to distribute the content and has a function as a terminal at each base point (a terminal, which can detect trigger information, and can perform operation according to the trigger information thus detected). Here, description will be given on a case where the hierarchical type live relay system is built up by using the first example in the embodiment of the invention as described above. Similarly, it is possible to build up the hierarchical type live relay system by using the second example in the embodiment of the invention.

In the hierarchical type live relay system, grouping is seen for each device and each terminal at each base point. In addition to the information, in which the session of the destination of the change of the session is specified, the change of the session is performed according to the information, which specifies the base point (devices/terminals) of each hierarchy.

As the hierarchical type live relay system as shown in FIG. 6, a conference system of a company may be assumed, which has a head office and a plurality of branch offices. In this case, live devices are installed hierarchically to suit hierarchical structure of the organization of the company. That is, an entire live device 11 is installed at the head office, and the details of the conference at the head office are relayed in live condition to all company staffs. From a content server 30, a recorded content is distributed to all of the company staffs from the head office. A base point live device 12 is installed at each of the branch offices, and the details of the conference at each of the branch offices is relayed in live condition to the company staffs, who belong to each branch office. A sub-base point live device 13 is installed at each positional post under the control of a branch office, and the details of the conference at each positional post are relayed in live condition to all of the company staffs, who belong to the positional post. UE 10 is a terminal, which each of the company staffs has.

In FIG. 6, the sequence information is notified from the session control server 20 to UE 10, and the sequence information is held at UE 10 (Step S601). It is assumed, for instance, that UE 10 has already arranged a session to each of the live devices. The description on session arrangement is not shown in FIG. 6. Under this condition, an entire session (distribution of the entire content) from the entire live devices 11 is started (Step S603). In one example of the conference system as described above, the entire content (live relay for the head office) is distributed to all of the company staffs from the head office.

Under this condition, in case the recorded content or the like is distributed in the middle of the course of the entire session, for instance, the change is made from the session where the streaming is made on the entire session to the session where the streaming is made on the recorded content. In this case, at the same time as the recorded content is sent to the conference room in live condition, the change to the session of the recorded content is carried out at each base point. More concretely, in response to the control from the session control server 20 (Step S605), the entire live device 11 embeds the trigger information to match the change of the recorded content into the session within the entire content (i.e. a position where the change is made to the session of the recorded content (Step S607). In response to the control from the session control server 20 (or the trigger information from the entire live device 11 may be detected), the distribution of the recorded content is started (Step S609).

In case the situation (where the recorded content is flown from the entire live conference room) is relayed in live condition from the entire live device 11 to each base point, there is no need that the change to the session of the content server 30 is performed. Further, the sequence may be set up in detail, and also, it may be so arranged that the recorded content from the content server 30 and the live relay by the entire live device 11 may be changed in the middle of the course or may be established as simultaneous session.

In case where the distributed content is sent back to the session of the entire live relay (i.e. the initial session) at the same time as the termination of the recorded content, the trigger information inserted in the recorded content (corresponding to the trigger action to return to the initial session) or the trigger information (the information such as "End of Sequence") to indicate the termination of the recorded message is transmitted (Step S611), and it is possible to return to the session for the initial entire live relay from the session of the recorded content (Step S613).

Also, when the session of the entire live relay has been terminated, the device and the terminal of the base point related to each base point can perform the change to the session of the next hierarchy. In the example of the conference system as described above, this corresponds to a case where the conference is opened to each of the branch offices after the conference of the entire company is completed by the live relay from the head office. Some of the base points are transmission sources of the receiving messages from the entire live device 11 (entire session) to the transmission to the devices and the terminals within the related base point, and neither the receiving nor the transmitting is required at an actual live conference room, and for the devices and the terminals other than the transmitting device at the base point, which is the transmission source (i.e. base point live device 12), the session is terminated or it is turned to standby status in preparation for another session change, as scheduled subsequently. For this standby condition, too, it may be described as a trigger action in the sequence information, and the trigger information corresponding to the trigger action (to return from the standby condition) or turning to the standby condition (such as waiting for data receiving of the trigger information by the session setup only) may be set up.

In this case, if it is so designed that one trigger information can bring different trigger actions for different devices and terminals, the increase of the data amount due to the embedding of the trigger information can be suppressed, and this contributes to the improvement of efficiency. In this example, in case the trigger information is transmitted from the entire live device at the same time as the termination of the entire content in Step S617 (the control may be carried out by the session control server in Step S615), and this trigger information is interrelated with the trigger action, which changes the received session to transmission session for a certain base point live device 12. For a certain base point live device 13 or the terminal, the receiving session is turned to the standby state, or it is interrelated to a trigger action, which sets the receiving session to the standby state or changes the receiving session to another receiving session. Then, by single trigger information, it is possible to perform different types of processing at different devices and terminals. As a result, the content from the base point live device 12 (base point content) is distributed to the devices and terminals, which belong to the base point (Step S619).

In case the session of the base point content from the base point live device 12 has been terminated, it is possible to change to the session of the sub-base point live device 13, which belongs to lower hierarchy. In this case, too, an operation similar to the operation of the change from the entire session to the base point session is carried out, and the transmission of the trigger information embedded in the base point content in Step S623 is performed (the control may be carried out by the session control server 20 in Step S612), and the change to the transmission session from the receiving session at the sub-base point live device 13, or the standby state at the device and/or the terminal belonging to the sub-base point, and the receiving of the session of the sub-base point content may be executed (Step S625).

As described above, in the hierarchical type live relay system of the present invention, the change of the session can be fractionalized, depending on the hierarchy, and even in the system as such, it is possible to perform efficient change of the session without increasing the processing load at the session control server 20. Here, description has been given on an example of the case of the session change when the hierarchy goes down (i.e. a case where the base point live device 12 is changed from the receiving session to the transmitting session), while the change of the session when the hierarchy goes up (i.e. a case where the base point live device 12 is changed from transmission session to the receiving session) or in case of the change of the session where the transmission base point and the receiving base point are replaced with each other (i.e. a case where the live conference rooms are replaced with each other) can be accomplished by similar procedure.

The change of the session may be terminated without being carried out by a session of some of the base points (in FIG. 6, it is the session of the sub-base point live device 13), while it would suffice that the conventional processing may be performed when the session is terminated, and specific trigger information to indicate the termination of the session is not necessarily required.

(Lower-Cost Communication System with CM)

Figure 7:
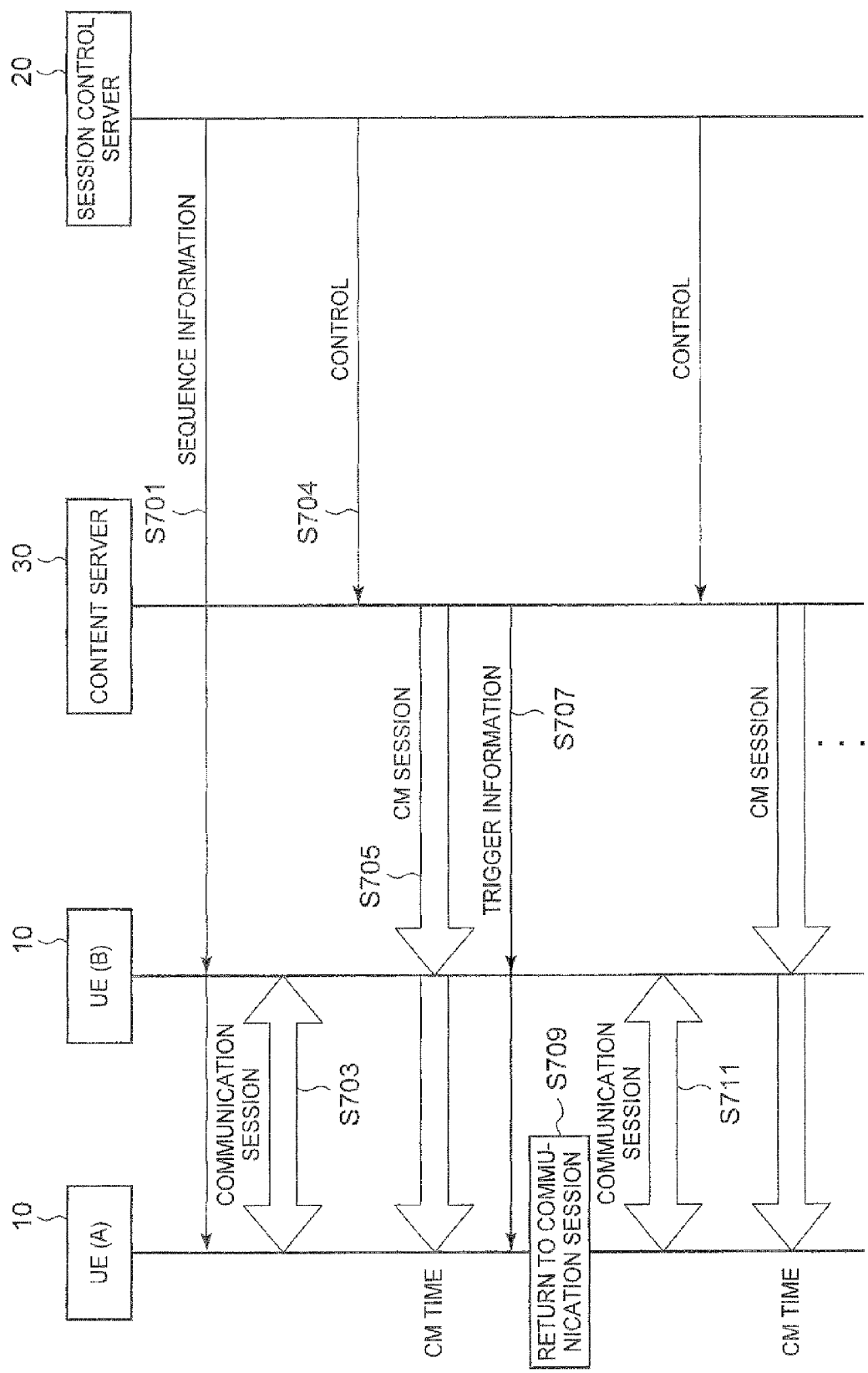
FIG. 7 is a sequence chart to show an example of operation in a lower-cost communication system with CM (commercial message) designed and constructed by applying the present invention.
Figure 8:
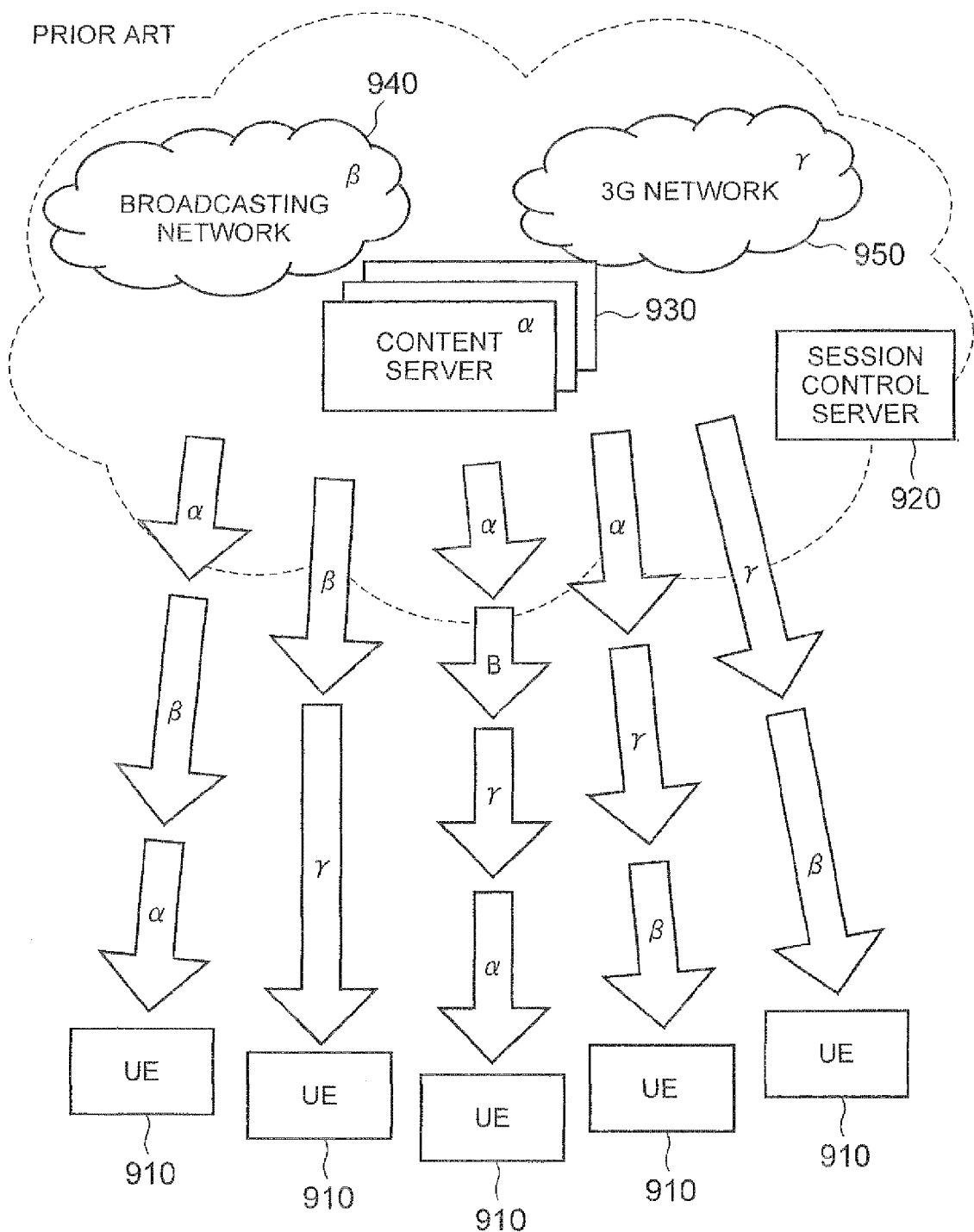
FIG. 8 is a schematical drawing to show a system arrangement to explain an example of the prior art.

FIG. 7 is a sequence chart to show an example of operation in a lower-cost communication system with CM (commercial message) as set up according to the present invention. In the lower-cost communication system with CM (commercial message) according to the invention, CM (commercial message) content is inserted in the middle of the communication given and taken between UE and UE, and this makes it possible to maintain the communication expense to be paid by the user at a lower cost.

In the lower-cost communication system with CM where the present invention is applied, it is necessary that the users give consent on the insertion of CM information (CM content) in the course of the communication between UE 10 and UE 10. The procedure for this is not within the scope of the invention. The CM information may be set up at the terminal in advance as preference, and it may arranged at the time of conclusion of the contract how much the amount of CM or communication cost should be (it is generally thought that the lower the countervalue to be paid is, the more the amount of CM (the time and the frequency of the use of CM) may be increased. There is no definite restriction on the format of CM information to be placed in the communication between UE 10 and UE 10. For instance, it is possible to arrange that CM information is notified to the users of UE 10 depending on whether it is animated picture, voice, still picture, character, etc. Also, CM information may be advertised by completely interrupting the communication between UE 10 and UE 10, or CM information may be given to such an extent that it may give neither hindrance nor inconvenience to the communication.

In FIG. 7, the sequence information is notified from the session control server 20 to UE (A) 10a and UE (B) 10b, and the sequence information is held and maintained (Step S701). Here, a case where the sequence information is notified to both of UE (A) 10a and UE (B) 10b is shown, while the sequence information may be notified only to one of UE 10 (A) 10a or UE (B) 10b. In case of the system where the trigger action is described in the trigger information as shown in the second example as given above, the notifying of the first sequence information is not needed.

It is supposed here that UE (A) 10a and UE (B) 10b are performing communication (Step S703). In this case, the content server 30 distributes CM content at an arbitrary timing (e.g. periodically or at all times) (Step S705). The distribution of CM content by the content server 30 may be controlled by the session control server as shown in Step S704, for instance. The content server 30 may distribute CM content to a specific UE 10, while it is desirable that the CM content is sent via broadcasting or via multi-casting.

On the other hand, at each UE 10, which is performing communication, the change to CM session where CM content is broadcasted (or multi-casted) is triggered. The change to CM session may be changed forcibly to CM session for each hour as determined by UEs 10, or it may be so arranged that UEs 10 performing communication with each other acquire the time of the change to CM session of the partner UE and may embed the trigger information (i.e. trigger information to match the trigger action to be changed to CM session). In case the change to CM session is carried out, some sort of notification may be given to the users so that it can be discriminated from the initial communication session, or such procedure may be described in the sequence information as one of the actions.

The trigger for the change of CM session is carried out for each of the UEs 10, depending on the setting up at each of UEs 10 (such as the frequency to provide the CM content). If the timing to insert the trigger information (the timing of the change of the session) is synchronized with CM content in such an extent that it is comprehensible for the session control server 20, it leads to the increase of the efficiency because the setting of the CM content may be performed in common. For instance, in case there is a UE 10 with such setting that CM is sent at the frequency of one per two minutes and another UE 10 with such setting that CM is sent at a frequency of one per four minutes, by equalizing the timing of the change of the session with each other, it would suffice if an instruction is given to the change to the same CM session for both of the UEs 10 as to a single CM. As a result, the CM session can be put together for both of the UEs 10 (i.e. CM session at a frequency of one per four minutes).

When the notification of CM content is terminated at UE 10, the change of the session is triggered so that it is returned to the communication session. In this case, the content server 30 embeds the trigger information in the CM content (Step S707), and by regarding the detection of the trigger information as a motive, UE carries out the trigger action to return to the initial communication session (Step S709). As a result, after the CM content has been notified, the communication session between UE (A) 10a and UE (B) 10b is resumed (Step S711).

In case the CM content is commonly used by a plurality of UEs 10 (i.e. a case where one CM session is used by a plurality of UEs 10), there may be a case where the setting of the time to send CM at each of the UEs 10 may be different from each other. In such case, by inserting two or more types of trigger information to match the change to the initial communication session, it is possible to discriminate for each of the terminals as follows: a terminal to return to the initial communication session by detecting the trigger information as inserted at the moment of 15 seconds of the CM session, a terminal to return to the initial communication session by detecting the trigger information inserted at the moment of 30 seconds of the CM session, a terminal to return to the initial communication session by detecting the End of Sequence of the CM content as the trigger information.

As the trigger action to match the trigger information, it is desirable that two or more UEs 10 can be changed (returned) to the initial session respectively by the designation of relative session such as a change to the initial communication session. In so doing, the designation of the change to individual session can be simplified, and the change to the initial communication session from the CM session can be collectively managed to match the increased number of UEs 10. Also, instead of the change to the CM session from the communication session, the receiving and the notification of the CM content by the CM session may be carried out at the same time as the communication session between UEs 10. For instance, it may be so arranged that the notification to the CM content can be given while continuing the communication between UEs 10.

(Emergency Quick Report Notifying System)

Further, it is also possible to set up an emergency quick report notifying system according to the present invention. In this case, it is assumed that there is general environment for use where each of UEs 10 sets up each individual session and performs communication. That is, each of the UEs 10 uses the content different from each other (transmitting, receiving, and further, both transmitting and receiving). UE 10 may be transmitting and receiving the broadcasting or multi-cast streaming. In such case, a plurality of UEs 10 transmit and receive the same content at the same time.

Under such circumstances, when it is necessary to distribute an emergency quick report (such as disaster information) is needed, trigger information to indicate that emergency quick report has come into the session as set up by each of the UEs 10. In case this is used at the same time as ETWS (Earthquake and Tsunami Warning System), it is conceivable that the trigger of notification may be carried out by ETWS, for instance. Even in such case, it may be possible to put a specific paging (i.e. notification from the network side to the terminal by ETWS) is given to match the trigger information, and to set up a trigger action to receive an emergency quick report at the sequence information.

As the trigger action to match the trigger information to indicate the emergency quick report, it is possible to set up so that the session is changed to a specific emergency quick report content (i.e. the session such as news report). Then, more detailed notification can be received. Because of the detailed property of the content, it is desirable that the emergency quick report content can be received by as many number of devices and terminals as possible by multi-casting or the like. Also, the trigger action to make preparation for the change of session to actual news content may be notified as the trigger information. For instance, in case the distribution of news content is started by broadcasting or multi-casting, UE 10 performs the change of the session in coordination with the starting of the distribution of the news content.

Further, depending on the degree of emergency of the information or the conditions of UE 10 (such as position of UE 10), the interest of the user (preference), etc., the session is maintained to identify the detailed information, and a trigger information to indicate whether it returns to the initial session or not (the trigger action may be included) is inserted into the sessions of the news content. Finally, the session of the news content is terminated, and all of the UEs 10 return to the initial session.

(Entry of New Users and Withdrawal of the Present Users)

Next, description will be given on the operation in the case where a user wants to view the content newly or a case where the user, who has been viewing the content up to now, wants to withdraw. The network side can update the details of the sequence information or the trigger action to be distributed to UE, depending on various conditions of the users: a case where the user wants to view new content, a case where the user wants to terminate the application for content viewing, to cut off the session for viewing of the content, to cut off power source of UE 10 (to stop all operations including the viewing of the content), etc. Detailed description will be given below by using an example of the hierarchical type live relay system as given above. In all of the aspects relating to the present invention (i.e. the first example and the second example in the embodiment of the invention, and various types of system where the present invention is applied), the operations relating to the entry of new users and the withdrawal of the current users can be applied.

Figure 11:
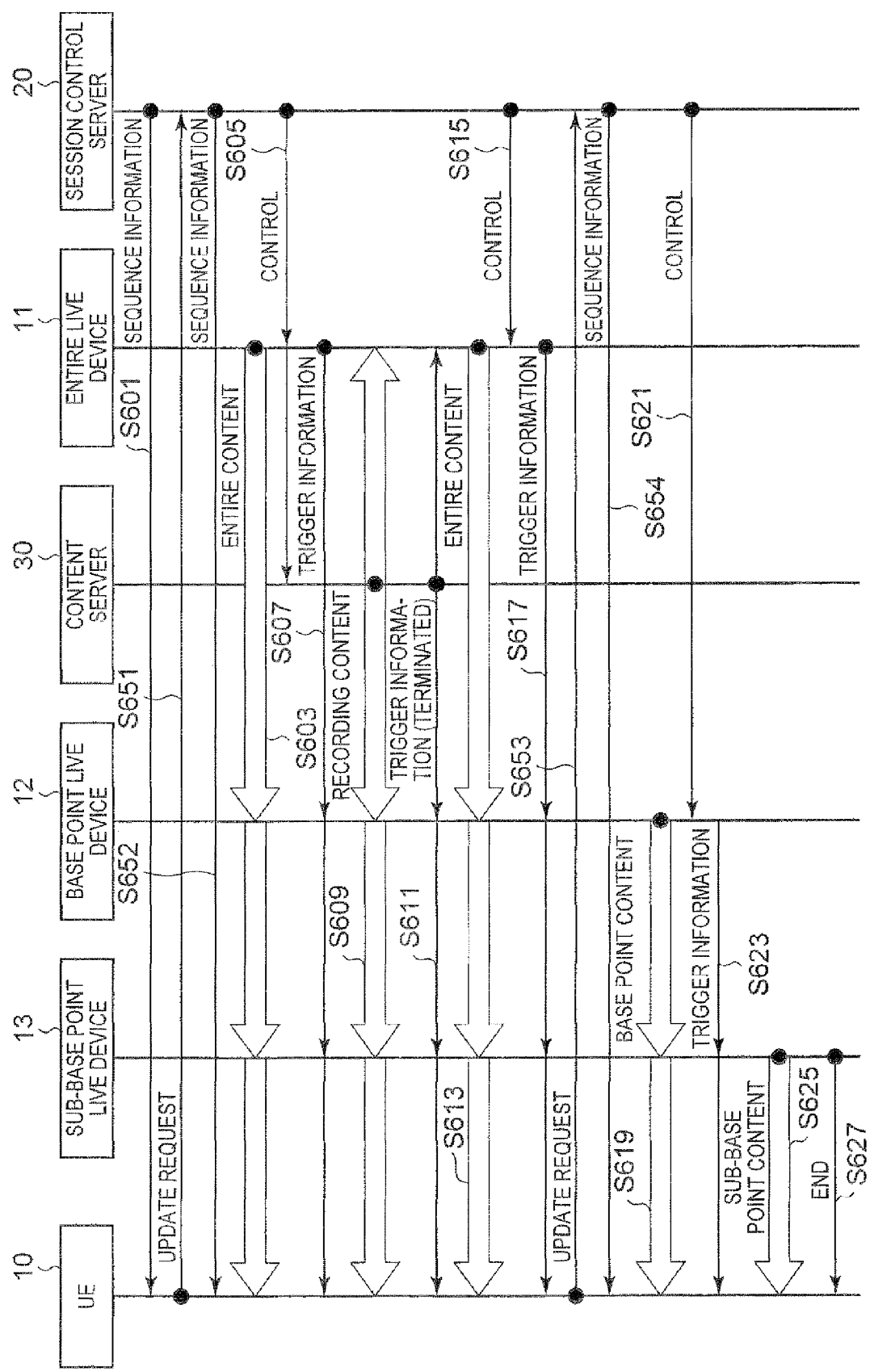
FIG. 11 is a sequence chart to show another example of operation in a hierarchical type live relay system designed and constructed according to the present invention.

FIG. 11 is a sequence chart to show an example of operation in a hierarchical type live relay system as set up according to the present invention. When a user, i.e. UE 10, receives basic sequence information from the session control server 20 (Step S601), own sequence information is generated according to the procedure as described above. In this case, when this user suddenly wants to participate from a base point where the participation has not been anticipated, the information relating to the base point where the user has decided to promptly participate (such as trigger action at the base point) is not included in the basic sequence information as distributed to the entire system, and the user cannot generate own sequence information. In response to this, UE 10 transmits an update requesting message to request the updating of the basic sequence information to the session control server 20 (Step S651). In this case, the information relating to the base point and the special features of the user (such as base point post number, company staff number, etc.) may be included. Also, it may be designed that the session control server 20 gives authentication of UE 10 or the user via the update requesting message.

When the update requesting message is received, the session control server 20 updates the basic sequence information so that the viewing can be made from the base point where the user suddenly decided to participate, and transmits this to UE 10 (Step S652). UE 10 generates own sequence information according to the basic sequence information newly acquired and starts the viewing of the content. In this case, the session control server 20 may transmit the updated basic sequence information only to UE 10 or may distribute it to the entire system (e.g. multi-casting distribution or broadcasting distribution). The former is useful in case the object of updating is limited to a specific user, and the communication traffic can be reduced. The latter is useful in the case where the object of updating is not limited to specific type of users or the object of updating includes a multiple number of users. Compared with the case of distributing the information individually (i.e. the case of "the former"), the processing of transmission at the session control server can be simplified.

Further, in a case where UE 10 was able to generate own sequence information from the basic sequence information distributed initially in Step S601 but could not discover the corresponding trigger action although the content has been received (or in case it fails in the trigger action processing or in case the result of the processing has turned to an error), and the viewing of the content may be interrupted, the update requesting message as described above may be transmitted.

For instance, the following trouble may occur: In FIG. 11, UE 10 has received the trigger information to request the change to the base point content from the entire content (Step S617), but the trigger action at the base point where the user is participating did not exist in own sequence information (a half-way condition where a trigger action of terminal of the content viewing is not present), it is not possible to view the base point content (and further, sub-base point content), which should have been viewed originally (naturally).

In this context, when UE 10 cannot generate own sequence information as in the above case, UE 10 transmits an update requesting message for requesting the updating of the basic sequence information to reflect the information relating to the base point where the user is participating (i.e. the state of the user) to the session control server 20 (Step S653). When the updating request message is properly received, the session control server 20 updates the basic sequence information so that the viewing can be made from the base point where the users are participating, and this is transmitted to UE 10 (Step S654). Based on the basic sequence information newly acquired, UE 10 generates own sequence information and starts the viewing of the content.

The reason why UE 10 could not generate the own sequence information may be other reasons. These reasons may include, for instance, that it is the content viewing immediately after the conclusion of the contract or after the purchase, or the reason may be because the information of UE 10 is not reflected in the basic sequence.

Figure 10:
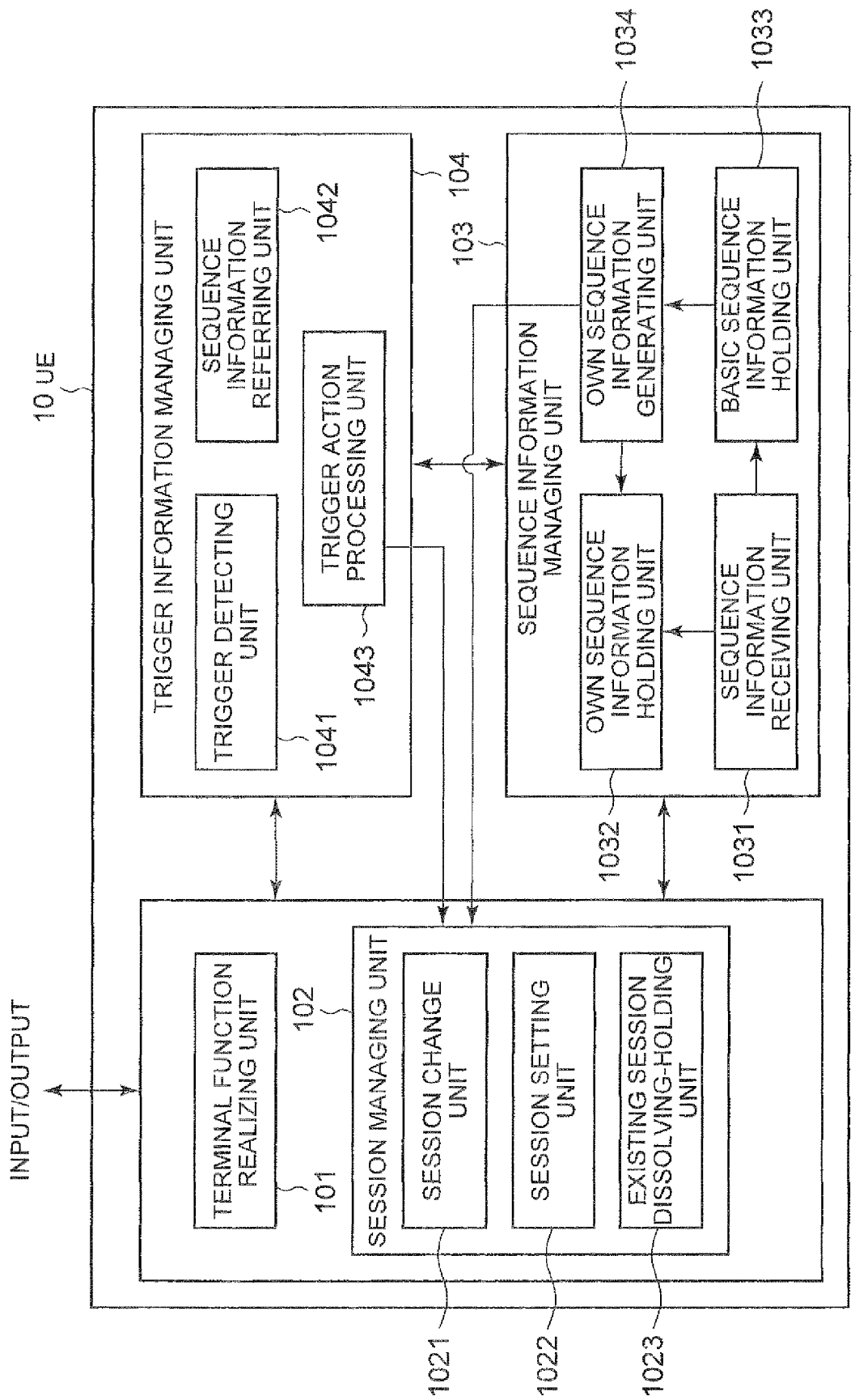
FIG. 10 is a schematical block diagram to show another example of an arrangement of UE in the embodiment of the invention.

Next, referring to FIG. 10, description will be given on an arrangement of UE 10, by which the update requesting message can be transmitted. UE 10 as shown in FIG. 10 has basically the same arrangement as the arrangement shown in FIG. 3, but the functions to perform the processing relating to the update requesting message are added to the own sequence information generating unit 1034, the trigger action processing unit 1043, and the session managing unit 102. For instance, in case the own sequence information generating unit 1034 could not generate own sequence information from the basic sequence information, it has the function to instruct the session control server 20 to transmit the update requesting message to the session managing unit 102. Also, in case the trigger action processing unit 1043 could generate the own sequence information because the corresponding trigger action is not present in own sequence information, it has the functions to instruct the session managing unit 102 to transmit an update requesting message to the session control server 20. Further, in case an instruction to transmit the update requesting message is received from the own sequence information generating unit 1034 or from the trigger action managing unit 1043, the session managing unit 102 has the functions to transmit the update requesting message to the session control server 20.

In case the own sequence information generating unit 103 instructs the session managing unit 102 to transmit the update requesting message, the processing is carried out as given below, for instance. In FIG. 10, the sequence information receiving unit 1031 acquires the basic sequence information and stores it in the basic sequence information holding unit 1033. Next, the own sequence information generating unit 1034 tries to generate the own sequence information according to the basic sequence information thus received. Because defect or imperfection occurs in a part or all of the trigger actions, the conditions as a sequence cannot be fulfilled. As a result, failure occurs in the generation of the own sequence information. After receiving these results, the own sequence information generating unit 1034 instructs the session managing unit 102 to transmit an update requesting message to the session control server 20. The session managing unit 102 receives this and transmits an update requesting message to the session control sever 20 (transmission of the update requesting message in Step S651 of FIG. 11). As a result, the sequence information receiving unit 1031 newly receives the basic sequence information from the session control server 20. Then, the sequence information receiving unit 1031 acquires the basic sequence information, and generates own sequence information according to similar procedure. In the basic sequence information received this time, trigger actions at the base point where the user decided suddenly to participate are included, and UE 10 can generate the own sequence information properly.

In case the trigger action processing unit 1043 instructs the session managing unit 102 to transmit the update requesting message, the processing will be performed as follows: For instance, as described below, a case where own sequence information could be generated, but the corresponding trigger action is not present in the own sequence information during content viewing, it may fall under half-way condition—that is, in case where the processing by the trigger action processing unit 1043 based on the trigger information detected by the trigger detecting unit 1041 and based on the own sequence information acquired by the sequence information referring unit 1042 may fall into the failure, for instance, or in case where the content at transition destination could not be found or in case the current content data are already stopped regardless of the trigger action to continue the current content viewing, or in case where the corresponding trigger action itself is not present, the trigger action processing unit 1043 instructs the session managing unit 102 to transmit the update requesting message to the session control server 20, and upon receipt of this message, the session managing unit 102 transmits the update requesting message to the session control server 20 (transmission of the update requesting message in Step S653 of FIG. 11). As a result, the sequence information receiving unit 1031 newly receives the basic sequence information from the session control server 20. The sequence information receiving unit 1031 acquires the basic sequence information and generates the own sequence information according to the procedure as the procedure already described. In the basic sequence information received this time, the trigger actions at the base point, to which the user suddenly decided to participate, are included, and UE 10 can generate the own sequence information properly.

Further, in case UE 10 discontinues the content viewing by withdrawing from the content viewing group, the option of the processing based on the trigger information can be reduced and the processing load can be decreased. Or, in case the trigger action information is distributed, it is possible to reduce the amount of information and to decrease the communication traffic. For instance, in case UE 10, which is the only participant from a certain base point, discontinues the content viewing because it moves from the reason such as official trip, UE 10 transmits an update requesting message (Step S651 or Step S653 of FIG. 11) to the session control server 20. The session control server 20 generates the basic sequence information by deleting the information relating to this base point and re-distributes it (Step S652 or Step S654 in FIG. 11), or the trigger information to instruct the notification of the control each time (Steps S605, S615 and S621 in FIG. 11) is regarded as irrelevant to that particular base point. As a result, the information relating to the base point can be deleted from the trigger action.

Further, in case where a multiple number of users want to have content viewing at the same time, this means that the session control server 20 receives the update requesting message from each individual UE 10, and this may lead to a situation where the load on the session control server 20 is increased which was cited as a problem in the initial stage. To cope with such case, the session control server 20 can reduce the load on the session control server 20 by arranging that various types of information can be received from the status managing server for the management of the user status (e.g. user log server, mobile log server, application server, server position managing server, neighborhood information providing server, etc.). Detailed description will be given below on an example of the hierarchical type live relay system in similar manner.

Figure 9:
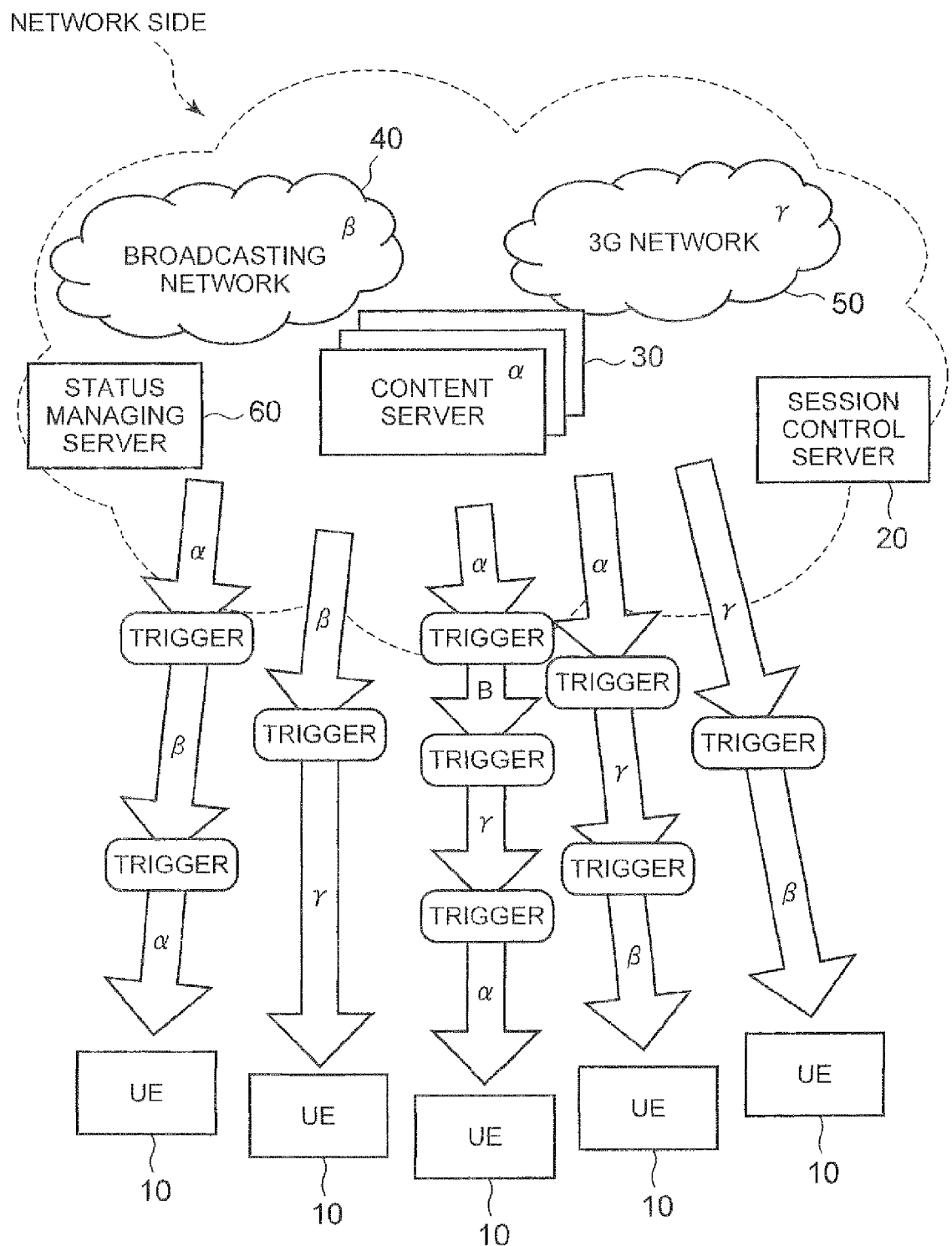
FIG. 9 is a schematical drawing to show a second arrangement to explain basic concept of the present invention.

FIG. 9 shows another example of a system configuration to explain basic concept of the present invention. In the system shown in FIG. 9, in addition to the arrangement elements as shown in FIG. 1, a status managing server 60 to manage dynamic status and static status of the user is installed. In FIG. 9, UE 10 can adequately notify the status of the user or UE 10 itself to the status managing server 60, and the status managing server 60 stores and maintains these data. The status managing server 60 performs communication to and from an external device such as a session control server 20 and can provide real-time information relating to the user or the status of the user or UE 10.

Figure 12:
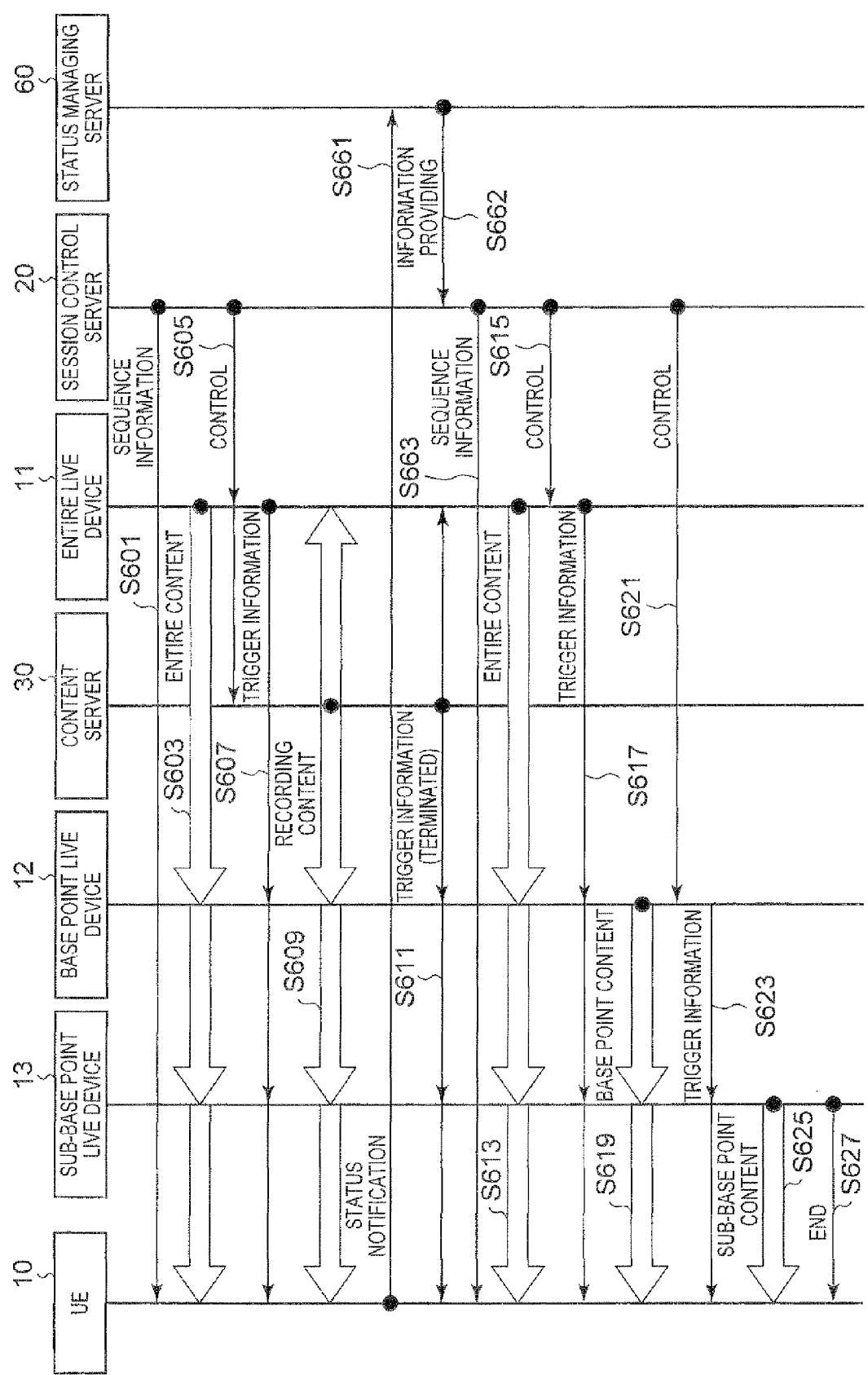
FIG. 12 is a sequence chart to show still another example of operation in a hierarchical type live relay system designed and constructed according to the present invention.

FIG. 12 is a sequence chart to show a still another example of operation in a hierarchical type live relay system designed by applying the present invention. UE 10 gives status notification to the status managing server 60 (transmission of status notifying message: Step S661) at an arbitrary timing; This includes: a case where a part or all of the own sequence information cannot be properly generated from the basic sequence information, or a case where the trigger action cannot be processed properly in the middle of the course of the content viewing, or at any other arbitrary timing. The details of the information to be notified to the status managing server 60 by UE 10 include, for instance: the information on the base points where the content viewing is started or terminated (position information, base point ID, etc.), user identification information (such as user ID, company staff ID, authentication/authorization number, device ID, etc.), information to identify the content of the object for viewing (content ID, conference ID, etc.), user authentication information, and others.

When the status notification is received from UE 10, the status managing server 60 provides the status as notified to the session control server 20 (providing of information: Step S662). In this case, the status managing server 60 may notify the session control server 20 after a certain constant amount of the status notification have been accumulated. Also, the notification may be given when status notification is received from a specific user or when specific conditions are satisfied by the status notification (e.g. in case a status notification from a user who wants to participate from a specific base point is received). As a result, there is no need to provide the information each time the status notification is received from UE 10. This leads to the decrease of the load on the status managing server 60 or the session control server 20. Also, this makes it possible to decrease the communication traffic between the status managing server 60 and the session control server 20.

Also, the status managing server 60 may carry out the providing of the information (Step S662) in response to the request from the session control server 20. Specifically, at the session control server 20, an inquiry is made to the status managing server 60 at a timing to prepare the basic sequence information or at a timing to prepare a control signal with respect to the content during the distribution, and the information of the relevant UE 10 may be acquired. As a result, it is possible to obtain adequate information to match the timing of processing of the session control server 20. Thus, compared with the case where the information is received non-synchronically, the processing load on the session control server 20 can be reduced.

Based on the information relating to UE 10 as acquired by the offer of the information in Step S662, the session control server 20 generates the basic sequence information or the trigger action, and distributes the basic sequence information to UE 10 (Step S663) or distributes the trigger action by including it in the control message to the entire live device 11 or the base point live device 12, etc. (Steps S615, S621, etc.).

Next, referring to FIG. 10, description will be given on the processing in case UE transmits a status notifying message to the status managing server 60. As already described, in case the own sequence information generating unit 1034 could not properly generate own sequence information or in case the trigger processing unit 1043 could not properly process the trigger action, the own sequence information generating unit 1034 or the trigger action processing unit 1043 instructs the session managing unit 102 to request the updating to the session control server 20. When this is received, the session managing unit 102 instructs the terminal function realizing unit 101 to give the status notification to the status managing server 60. Upon receipt of this message, the terminal function realizing unit 101 transmits the status notifying message to the status managing server 60 (transmission of the status notifying message in Step S661 of FIG. 1). As a result, the sequence information receiving unit 1031 newly receives the basic sequence information from the session control server 20. Then, the sequence information receiving unit 1031 acquires the basic sequence information and generates the own sequence information by the same procedure as described above. The trigger action at the base point, to which the user suddenly decided to participate, is also included in the basic sequence information received this time, and UE 10 can properly generate the own sequence information.

As described above, by reflecting the user status information of the status managing server 60 on the basic sequence information or on the trigger action, the session control server 20 can acquire necessary information by making access to the status managing server 60 at an arbitrary timing and can update the sequence information or the trigger action. As a result, compared with the case where the user status information is collected non-synchronically from each individual UE 10, it is possible to suppress the load on the devices of the network side such as the session control server 20.

Further, the invention can also be applied to a case where a large amount of the request on the change of the session may occur as seen in the past such as the case of broadcasting of plural mixed sessions (where the aspects to show which session at which timing to the viewers are diversified). Also, the present invention can be applied on a case where interactive broadcasting/communication services are offered such as a user-participating type system (where it is not definitely known when and which user finds its turn). Further, the present invention can also be applied to a case of quick report during the course of communication (which changes depending on disaster, damaged area, region, characteristics of the user, etc.), or the change of content as distributed from key station or local station (which is subject to change, depending on the location of viewing and communication), or meeting or conference classified for each hierarchy (the hierarchical live relay system as described above) where the content are changed according to the status of the user.

Each of the functional blocks as described in the embodiments of the invention as described above can be accomplished as an LSI (Large Scale Integration), which is typically represented by an integrated circuit. These may be produced individually as one chip, or it may be produced as one chip, which contains a part or all. Here, it is referred as LSI, while it may be referred as IC (Integrated Circuit), system LSI, super LSI, or ultra LSI, depending on the difference in the degree of integration.

Also, the technique of circuit integration is not limited to LSI, but it may be realized as a dedicated circuit or a general-purpose processor. Or, after the manufacture of LSI, FPGA (Field Programmable Gate Array), which can be programmed as the manufacture of LSI, or a reconfigurable processor may used, in which LSI can be reconfigured.

Further, with the advancement of semiconductor technique or other type of technology derived from it, if a new technique of circuit integration may emerge and replace LSI, functional blocks may be integrated by using such technique. For instance, adaptation to biotechnology is one of such possibilities.

INDUSTRIAL APPLICABILITY

The present invention provides such effects that the change of the session can be realized seamlessly and with high degree of freedom while reducing the increase of the processing load on session control server by the request of the change of the session from the terminal and to decrease the load on the network traffic, and the invention can be applied to the technique relating to the change of the session when various types of contents are used.

The invention claimed is:

1. A session change method to be carried out when a communication device setting up a session with a content server on a content distribution side changes the session to a different session, said session change method comprising: a trigger information notifying step in which said content server notifies said communication device of trigger information to get said communication device to change the session currently set up to the different session; a trigger information receiving step in which said communication device receives said trigger information; and a session changing step in which said communication device changes said session according to said trigger information, wherein, in case the communication device cannot change said session according to said trigger information based on said information to indicate the relation between said trigger information and said desired trigger action, said communication device re-constructs said information to indicate the relation between said trigger information and said desired trigger action.

2. The session change method according to claim 1, wherein said trigger information is embedded at a point where said session is changed in the content distributed by the session currently set up, and wherein said content server distributes said content where said trigger information is embedded in said trigger information notifying step.

3. The session change method according to claim 2, comprising a step in which said content server embeds said trigger information at a point where said session is changed in said content distributed by said session currently set up.

4. The session change method according to claim 1, wherein a trigger action to indicate change to a specific session is set up according to said trigger information.

5. The session change method according to claim 4, wherein a trigger action to indicate the change of specific sessions different from each other is set up according to each of said plural trigger information.

6. The session change method according to claim 4, wherein the information to indicate a relation between said trigger information and said trigger action is delivered to said communication device prior to the notification of said trigger information to said communication device from said content server.

7. The session change method according to claim 6, wherein said communication device maintains information specifying a relation between a desired trigger action to indicate the change to a desired session and trigger information corresponding to said desired trigger action, and wherein said communication device changes said session according to said trigger information based on said information to indicate the relation between said trigger information and said desired trigger action.

8. The session change method according to claim 4, wherein said trigger action corresponding to said trigger information is delivered from said content server to said communication device at the same time as said trigger information.

9. The session change method according to claim 4, wherein, in said trigger information or in said trigger action, a condition for said communication device to change said session is described.

10. The session change method according to claim 9, wherein, in case the condition for said communication device to change said session is not met, said communication device re-acquires said trigger action.

11. The session change method according to claim 4, wherein, in said trigger information or in said trigger action, a method of changing said session or an operation to be performed after changing said session is described.

12. The session change method according to claim 1, wherein plural trigger actions to indicate the change to different sessions are set up according to said trigger information.

13. The session change method according to claim 12, wherein, in said trigger information or in said trigger action, the condition to select among said plural trigger actions is described.

14. The session change method according to claim 1, wherein said different session is a transmission session to distribute a content from said communication device.

15. A session change device for changing a session as set up with a content server on a content distribution side to a different session, said session change device comprising: a unit configured to receive, from said content server, trigger information to get said session change device to change the session currently set up to the different session; and a unit configured to change said session according to said trigger information, wherein, in case the communication device cannot change said session according to said trigger information based on said information to indicate the relation between said trigger information and said desired trigger action, said communication device re-constructs said information to indicate the relation between said trigger information and said desired trigger action.

16. The session change device according to claim 15, wherein said trigger information is embedded at a point where said session is changed in the content being received in said currently established session.

17. The session change device according to claim 15, wherein said different session is a transmission session to distribute a content.

18. The session change method according to claim 1, wherein said communication device changes said session without sending a request to change said session to the session control server.